(12) United States Patent
Ohta et al.

(10) Patent No.: US 8,788,148 B2
(45) Date of Patent: Jul. 22, 2014

(54) DRIVER ASSISTANCE SYSTEM AND DRIVER ASSISTANCE METHOD

(75) Inventors: Mitsunori Ohta, Machida (JP); Takeshi Kimura, Yokohama (JP); Taku Suzuki, Isehara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 305 days.

(21) Appl. No.: 13/321,092

(22) PCT Filed: Apr. 9, 2010

(86) PCT No.: PCT/JP2010/056434
§ 371 (c)(1),
(2), (4) Date: Nov. 17, 2011

(87) PCT Pub. No.: WO2010/134396
PCT Pub. Date: Nov. 25, 2010

(65) Prior Publication Data
US 2012/0072097 A1    Mar. 22, 2012

(30) Foreign Application Priority Data

May 21, 2009 (JP) ................................. 2009-122846
Jan. 29, 2010 (JP) ................................. 2010-017992

(51) Int. Cl.
*G06F 17/00* (2006.01)
*G08G 1/00* (2006.01)

(52) U.S. Cl.
USPC ............................................ 701/41; 701/300

(58) Field of Classification Search
USPC ............... 701/1, 41–44, 70, 71, 78, 117–119, 701/300–302
See application file for complete search history.

(56) References Cited

U.S. PATENT DOCUMENTS

| | | | | |
|---|---|---|---|---|
| 6,636,801 B2 * | 10/2003 | Curbow | ........................ | 701/516 |
| 7,226,389 B2 | 6/2007 | Steen et al. | | |
| 7,639,148 B2 | 12/2009 | Victor | | |
| 7,904,246 B2 | 3/2011 | Kondoh et al. | | |
| 2004/0073449 A1 * | 4/2004 | Yang | ................................. | 705/1 |
| 2004/0090320 A1 * | 5/2004 | Suzuki et al. | ................. | 340/435 |

(Continued)

FOREIGN PATENT DOCUMENTS

| | | |
|---|---|---|
| CN | 1732102 A | 2/2006 |
| CN | 1802273 A | 7/2006 |

(Continued)

*Primary Examiner* — Jason Holloway
(74) *Attorney, Agent, or Firm* — Foley & Lardner LLP

(57) ABSTRACT

Risk and/or control status are presented in such a way that the vehicle driver can easily comprehend the fact. Upon detecting risk during driving a vehicle, the vehicle is controlled and information of at least one of the risk and the status of the vehicle being controlled is presented in visual form. In addition, the driver's initiative (D) in driving the vehicle is calculated (step S2), and the visual form, in which the information is presented, is altered depending on the calculated driver's initiative (step S3). When, for example, a lane departure prevention control works, the status of restraining lane departure is presented by arrow(s) in an anti-lane-departure direction opposite to the direction of lane departure. The size (including the length and the width) and color of the arrow(s) are altered depending on the initiative (D). Here, when the initiative (D) is at a low level, the arrow(s) is set in color, for example, 'red' and increased in size because the risk that the tendency of lane departure may increase becomes high.

20 Claims, 43 Drawing Sheets

(56) References Cited

U.S. PATENT DOCUMENTS

| | | |
|---|---|---|
| 2005/0030184 A1 | 2/2005 | Victor |
| 2006/0079377 A1 | 4/2006 | Steen et al. |
| 2007/0032914 A1 | 2/2007 | Kondoh et al. |
| 2007/0106475 A1 | 5/2007 | Kondoh |
| 2008/0295506 A1 | 12/2008 | Saito et al. |
| 2009/0037052 A1 | 2/2009 | Ogasawara et al. |
| 2009/0037064 A1 | 2/2009 | Nakamura et al. |
| 2010/0033333 A1* | 2/2010 | Victor et al. .................. 340/576 |
| 2010/0179719 A1 | 7/2010 | Kimura et al. |
| 2010/0219947 A1* | 9/2010 | Kataoka ........................ 340/461 |
| 2010/0280751 A1* | 11/2010 | Breed ........................... 701/207 |
| 2010/0289885 A1* | 11/2010 | Lu et al. ......................... 348/61 |
| 2012/0116643 A1 | 5/2012 | Kimura et al. |
| 2013/0147638 A1* | 6/2013 | Ricci ............................ 340/905 |

FOREIGN PATENT DOCUMENTS

| | | |
|---|---|---|
| CN | 1907750 A | 2/2007 |
| CN | 1967147 A | 5/2007 |
| CN | 101287634 A | 10/2008 |
| CN | 101314353 A | 12/2008 |
| CN | 101367382 A | 2/2009 |
| JP | 11-129783 A | 5/1999 |
| JP | 2002-269683 A | 9/2002 |
| JP | 2005-234773 A | 9/2005 |
| JP | 2007-122142 A | 5/2007 |
| JP | 2007-182224 A | 7/2007 |
| JP | 2008-305096 A | 12/2008 |
| JP | 2008-307951 A | 12/2008 |
| WO | WO 2005/123440 A1 | 12/2005 |

\* cited by examiner

FIG. 3
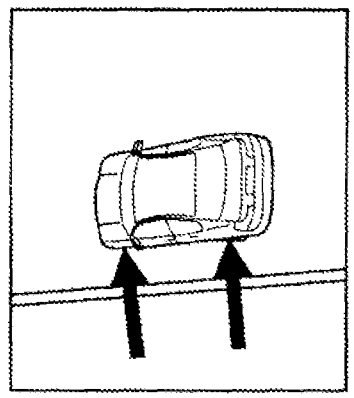
LDP
D: LOW
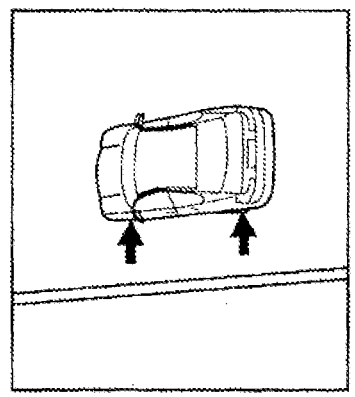
D: INTERMEDIATE
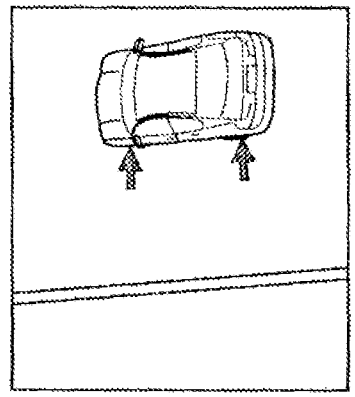
D: HIGH

FIG. 4
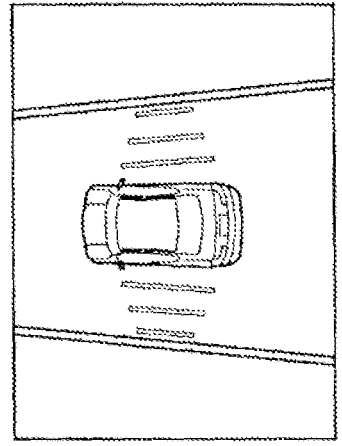
MB
(CONTROL RELATIVE TO LANE)
D: LOW
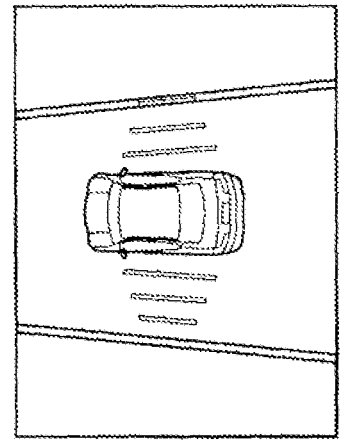
D: INTERMEDIATE
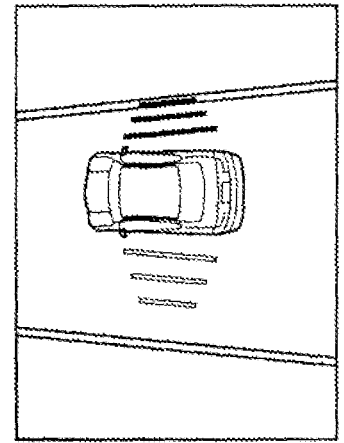
D: HIGH FIG. 5
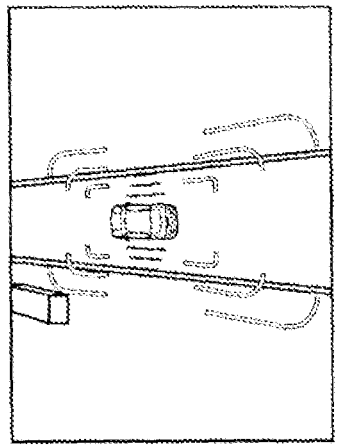
D: HIGH
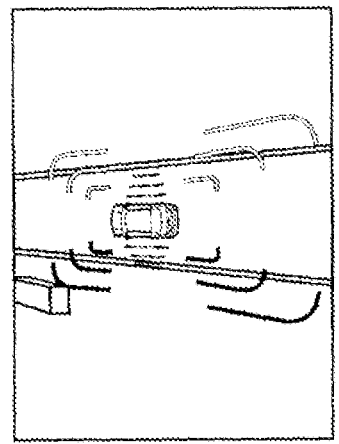
D: INTERMEDIATE
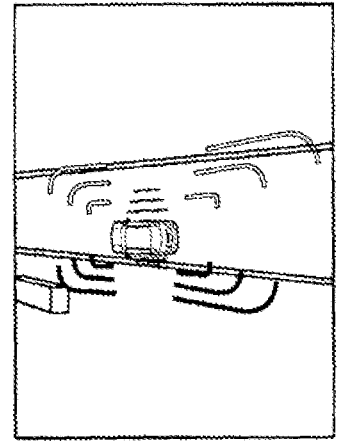
D: LOW
MB
CONTROL RELATIVE TO OBJECT(S)

FIG. 6
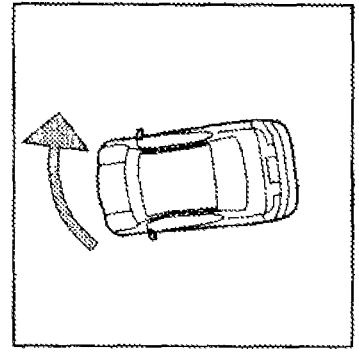
D: HIGH
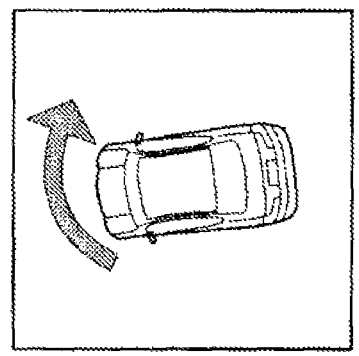
D: INTERMEDIATE
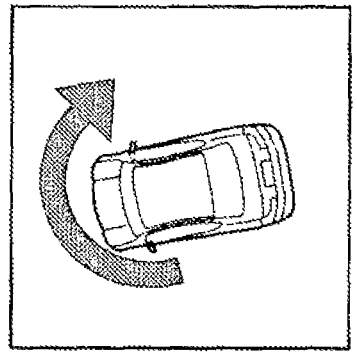
D: LOW
VDC

FIG. 7
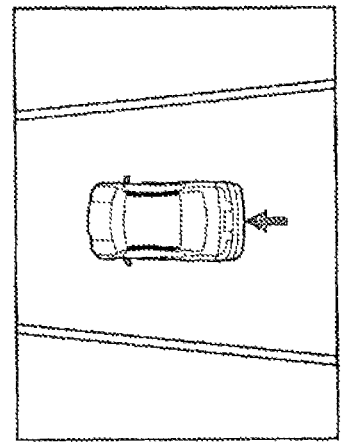
D: HIGH
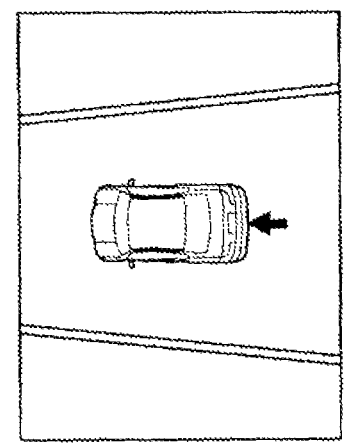
D: INTERMEDIATE
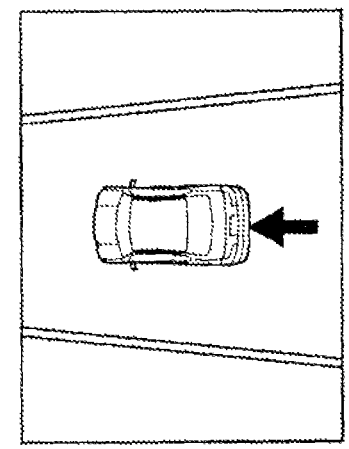
D: LOW
HSA

FIG. 8
HDC
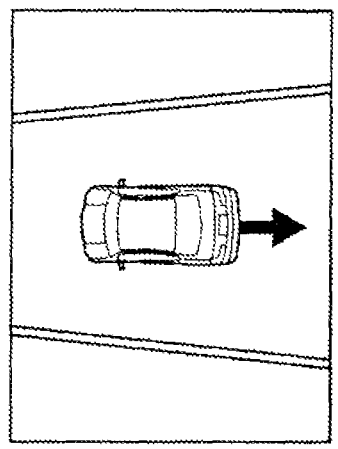
D: LOW
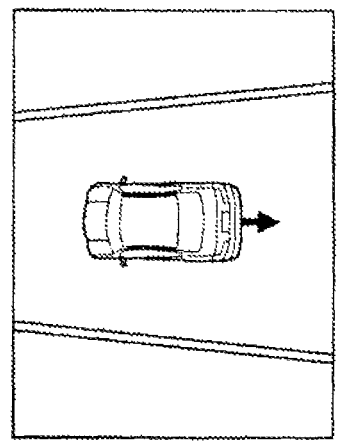
D: INTERMEDIATE
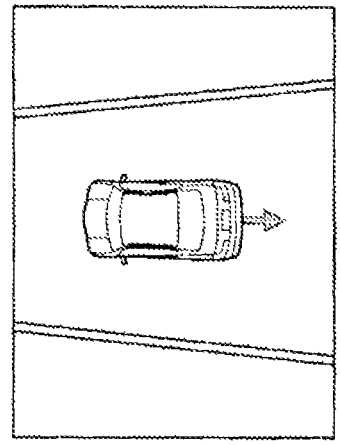
D: HIGH

OPERATING STATE INDICATOR

RISK INDICATOR

FIG. 19
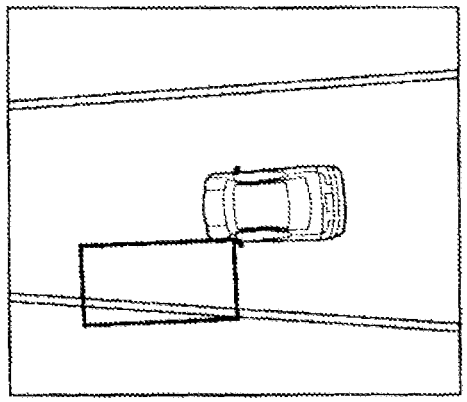
D: HIGH
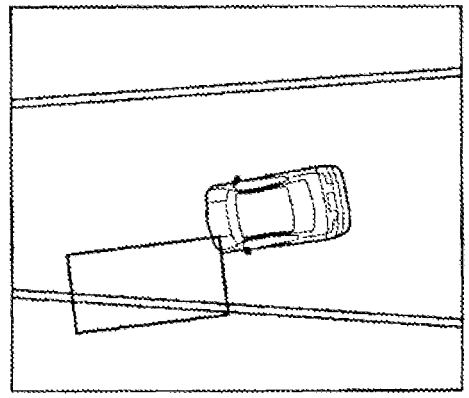
D: INTERMEDIATE
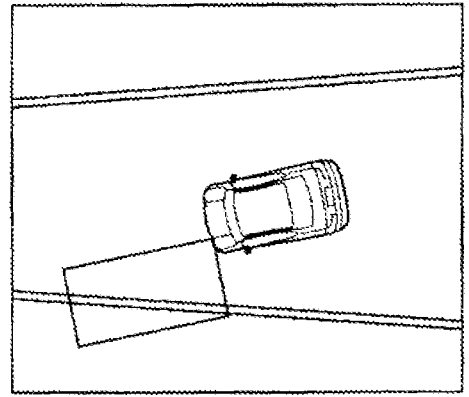
D: LOW
RISK IN THE FUTURE FIG. 20
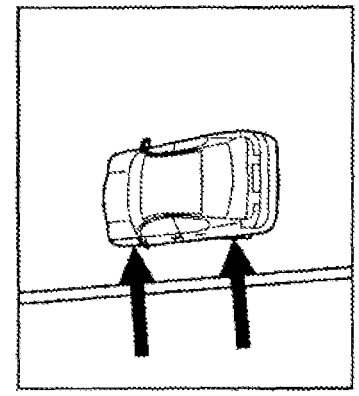
CURRENT MOTION OF VEHICLE
D: LOW
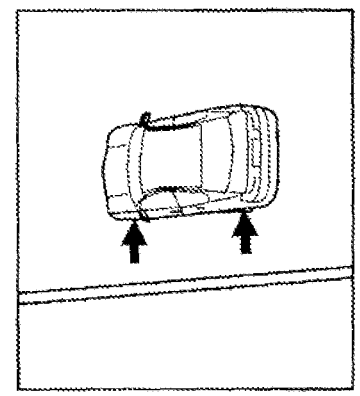
D: INTERMEDIATE
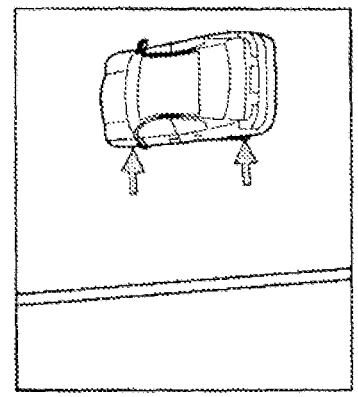
D: HIGH FIG. 21
VEHICLE MOTION CONTROL IN OPERATION (PAST)
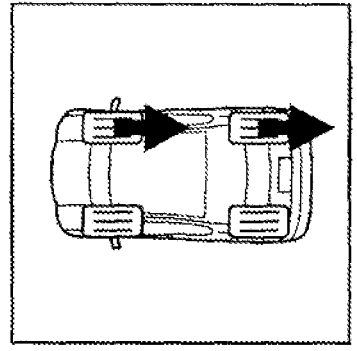
D: LOW
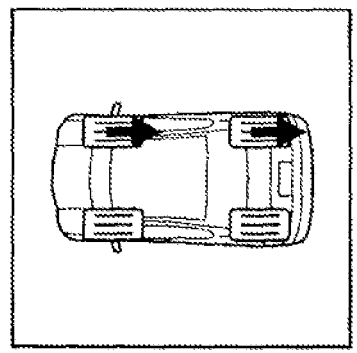
D: INTERMEDIATE
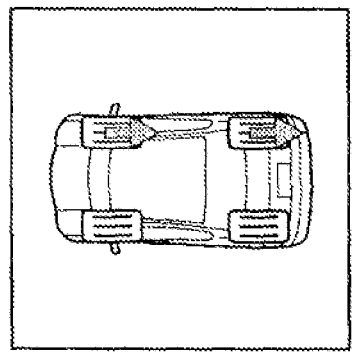
D: HIGH LOW COEFFICIENT OF FRICTION $\mu$

SCHOOL ZONE

FIG. 46
ENTIRE IMAGE
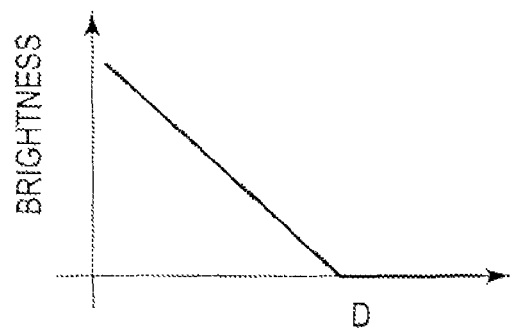
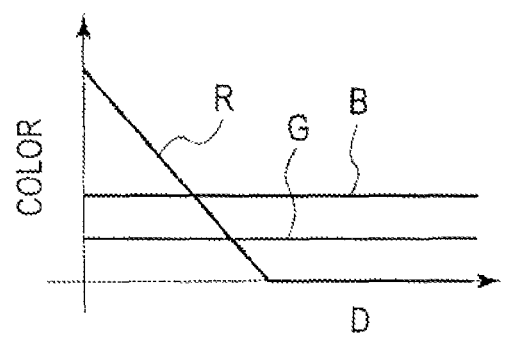
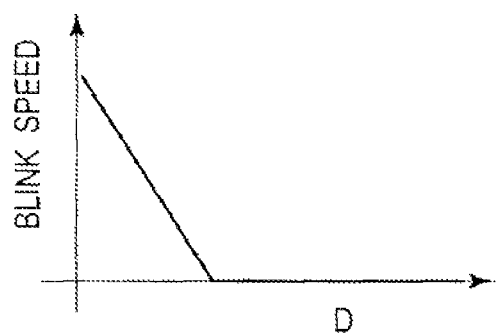
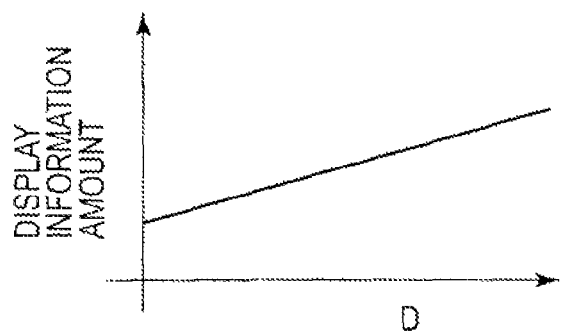

FIG. 49
ENTIRE IMAGE
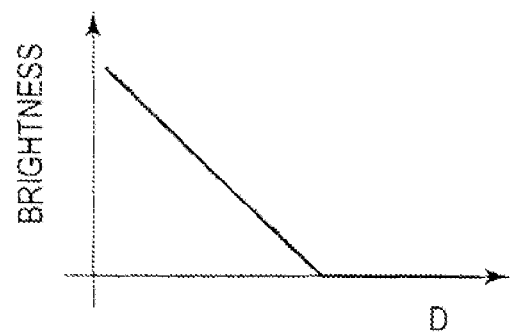
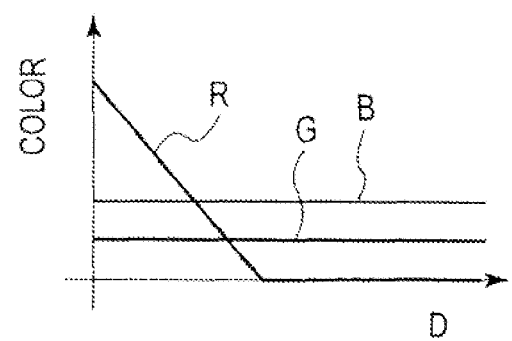
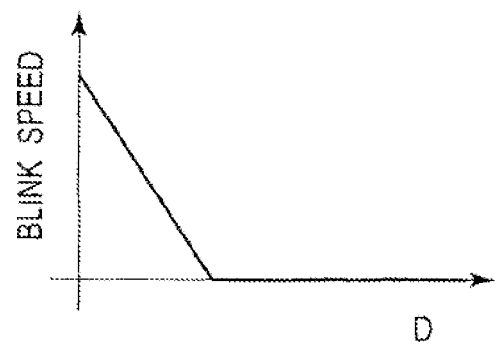
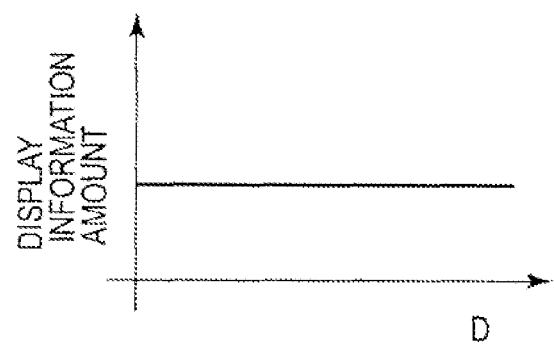

DRIVER ASSISTANCE SYSTEM AND DRIVER ASSISTANCE METHOD

TECHNICAL FIELD

The present invention relates to a driver assistance system and a driver assistance method.

BACKGROUND ART

There is a conventional technology which calculates risk potential based on driving and road conditions in the surroundings of a host vehicle, and then presents the risk potential on a monitor, in visual form, such as an indicator or a numerical value, to thereby call the driver's attention to the risk potential (refer to Patent Literature 1).

CITATION LIST

Patent Literature

Patent Literature 1: Japanese Patent Unexamined Publication No. 2007-182224

SUMMARY OF INVENTION

Technical Problem

It is assumed that, in a system which combines a plurality of vehicle motion controls including at least two or more of a lane departure prevention (LDP) control, a distance control (MB: Magic Bumper), a stability control (VDC: Vehicle Dynamics Control) and the like, there is any control intervention by one of the plurality of vehicle motion controls from the stage where, for example, risk is low. If representation of the risk and/or the control status (i.e., the status of the vehicle being controlled) is uniform, a driver's comprehension of the risk and/or the control status may be difficult.

It is an object of the present invention to present, via a display device, at least one of the risk and the control status in a more effective way, so that the driver can easily comprehend the risk and/or control status.

Solution to Problem

For solving the above problem, a driver assistance system according to the present invention controls a vehicle upon detecting risk during driving the vehicle and presents information, in visual form, of at least one of the risk and the status of the vehicle being controlled. In addition, the system calculates the driver's contribution amount in driving the vehicle and alters the visual form in which the information is presented, depending on the calculated driver's contribution amount.

Advantageous Effects of Invention

The driver assistance system according to the present invention can present information in a more effective way than presenting the information uniformly, because the system alters a visual form in which the information is presented, depending on the driver's contribution amount. Thus, it becomes easy for the driver to comprehend the risk and/or control status.

BRIEF DESCRIPTION OF DRAWINGS

FIG. 3 shows the representation of the information, in visual form, on the control status of lane departure prevention control.

FIG. 4 shows the representation of the information, in visual form, on the control status of distance control relative to a lane.

FIG. 5 shows the representation of the information, in visual form, on the control status of the distance control relative to object(s) in the surroundings of an own vehicle.

FIG. 6 shows the representation of the information, in visual form, on the control status of stability control.

FIG. 7 shows the representation of the information, in visual form, on the control status of hill-start assist control.

FIG. 8 shows the representation of the information, in visual form, of the control status of hill descent control.

FIG. 19 shows the future state of risk caused due to lane deviation.

FIG. 20 shows the present state of the motion of the vehicle depending on the operating state of the lane departure prevention control.

FIG. 21 shows the past state of the operating state of the lane departure prevention control.

FIG. 46 shows various maps, each being used for determining a visual form which is in accordance with the driver's contribution amount.

FIG. 49 shows various maps, each being used for determining a visual form which is in accordance with the driver's contribution amount.

DESCRIPTION OF EMBODIMENTS

Hereinafter, embodiments of the present invention are set forth based on drawings.

First Embodiment

Structure

Figure 1:
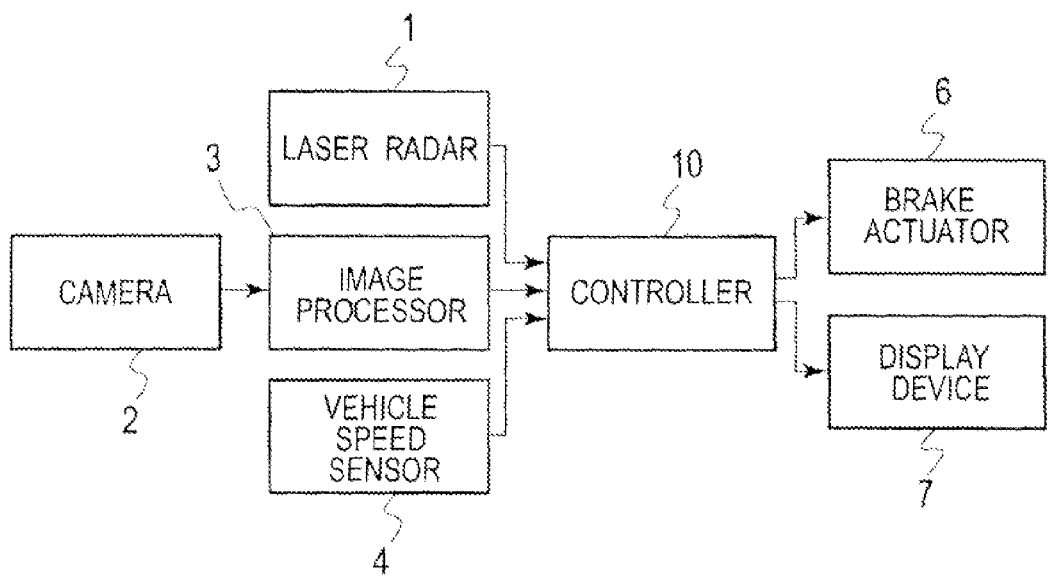
FIG. 1 is a schematic diagram of a driver assistance system.

FIG. 1 is a schematic diagram of a driver assistance system.

Figure 2:
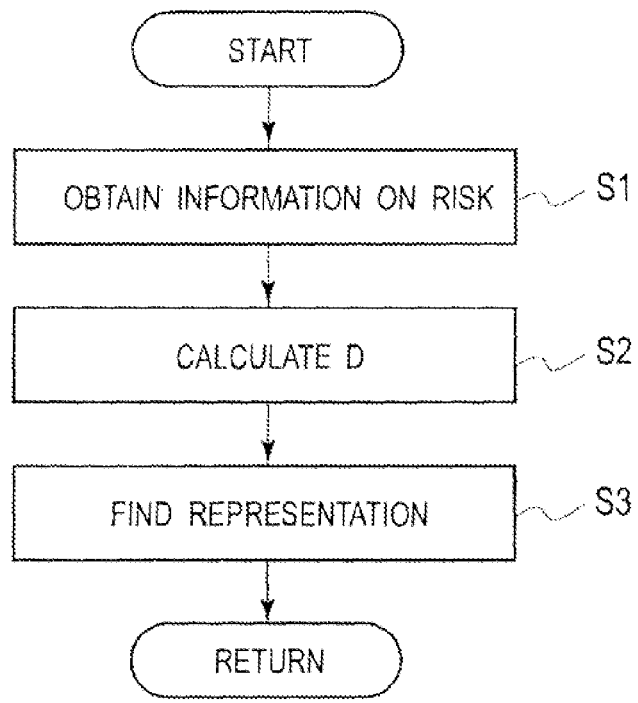
FIG. 2 is a flowchart showing representation control processing.

FIG. 2 is a flowchart of representation control processing.

Laser radar 1 detects the position of an object ahead of an own vehicle and the distance to the object from the own vehicle to provide the detected data as input to a controller 10. A camera 2 takes an image of an area ahead of the own vehicle. An image processor 3 recognizes the driving and road conditions information based on the image taken by the camera 2 to provide the recognized driving and road conditions information as input to the controller 10. A vehicle speed sensor 4 detects a vehicle speed of the own vehicle to provide the detected vehicle speed as input to the controller 10.

As will be described later, the controller 10 finds risk caused due to the motions of the vehicle and driving and road conditions in the surroundings of the vehicle. In response to the risk, the controller 10 controls drive stage of a brake actuator 6. In addition, the controller 10 produces the information on the risks and the information on what is being controlled and transmits them to the vehicle driver via a display device 7.

The brake actuator 6 has hydraulic equipment, such as a solenoid valve and pump. The controller 10 conducts individual control of hydraulic pressure within each of wheel cylinders regardless of a vehicle driver demand via a brake pedal by controlling the drive stage of the hydraulic equipment.

A display monitor of a navigation system or a combination meter or a heads up display (IHUD) which casts an image on a predetermined area of a front windshield of the vehicle by using light rays may be used as the display device 7.

The controller 10 combines a plurality of vehicle motion controls including at least two of a lane departure prevention (LDP) control, a distance control (MB: Magic Bumper), a stability control (VDC: Vehicle Dynamics Control), a hill-start assist (HSA) control, a hill descent control (HDC), and the like.

The lane departure prevention (LDP) control restrains, upon detecting the tendency of departure of the vehicle from its lane, the deviation from the centerline of the lane from increasing by generating a difference in brake force between right and left wheels to provide a yaw moment in such a direction as to restrain the deviation.

The distance control (MB) creates a spurious repulsive force upon compression of a virtual spring, which is assumed to present between the front end of the vehicle and an object ahead of the vehicle or between one of the sides of the vehicle and an object on the side of the vehicle, when the vehicle approaches the object. If the repulsive force is in the longitudinal direction of the vehicle, the longitudinal control of the vehicle is carried out by increasing brake force or decreasing driving force by torque control in the engine or gear shift control in the transmission. During the longitudinal control, when the vehicle driver operates an accelerator pedal or a gas pedal, the reaction force transmitted to the vehicle driver via the accelerator pedal is increased. Moreover, if the repulsive force is in the lateral direction, the lateral control of the vehicle is carried out by generating a difference in brake force between right and left wheels to provide a yaw moment in a direction away from the object or by providing a bias to a steering wheel by an assist torque in a direction away from the object.

The vehicle dynamic control (VDC) stabilizes the motion of the vehicle upon detecting oversteer or understeer by generating a difference in brake force between right and left wheels to provide a yaw moment in an anti-oversteer or anti-understeer direction or by providing a bias to a steering wheel by an assist torque in an anti-oversteer or anti-understeer direction.

The hill-start assist (HAS) control prevents the vehicle from moving in reverse from a standstill on a steep upslope upon restarting the vehicle by maintaining the brake force for a duration from the time of releasing a brake pedal to the time of stepping on an accelerator pedal.

The hill descent control (HDC) restrains speed of the vehicle during driving down a steep downslope by controlling the brake force.

The controller 10 executes the representation control processing shown in the flowchart in FIG. 2 to transmit to the vehicle driver the information on at least one of the above-mentioned risk and vehicle motion control via the display device 7.

Next, the representation control processing is described.

Firstly, at step S1, there is obtained risk information:—a lane departure tendency of an own vehicle, a tendency of approaching an object surrounding the vehicle, a tendency of an understeer or oversteer, and a road gradient of upslope or downslope.

At the subsequent step S2, the driver's contribution amount D in driving the vehicle is calculated using the following equation (1).

$$D=(D1+D2)/2 \quad (1)$$

$$D1=A/(A+B)$$

$$D2=E/(E+F)$$

where: "A" denotes that vehicle motion which depends on a driver's operation; "B" denotes vehicle motions which depend on status of the vehicle being controlled by the vehicle motion controls; "A+B" denotes the vehicle behavior: "E" denotes a predicted vehicle motion which depends on the predicted driver's operation that is predicted to happen in the future after a predetermined time passes; "F" denotes predicted vehicle motions which depend on status of the vehicle being controlled by the vehicle motion controls in the future after the predetermined time passes: and "E+F" denotes the predicted vehicle behavior that is predicted to happen in the future after the predetermined time passes. Moreover, D1 denotes a ratio of that vehicle motion which depends on the driver's operation to the vehicle behavior; and D2 denotes a ratio of (i) the predicted vehicle motion which depends on the predicted driver's operation that is predicted to happen in the future after the predetermined time passes to (ii) the predicted vehicle behavior that is predicted to happen in the future after the predetermined time passes. The driver's contribution amount D is defined as the average of D1 and D2.

Thus, the higher the driver's contribution amount D, the lower the control intervention by the vehicle motion controls. This means that the vehicle behavior depends mainly on the driver's operation. On the other hand, the lower the driver's contribution amount D, the higher the control intervention by the vehicle motion controls. This means that the vehicle behavior does not depend mainly on the driver's operation.

It is now described what the driver's contribution amount D is like if a yaw rate of the vehicle is used as one example of the vehicle motion.

Firstly, as shown in the following equation (2), a yaw rate γ is calculated based on an equivalent two-wheel model of the vehicle and used to define the vehicle motion A. In the following equation, V the vehicle speed, Sf the stability factor, L the wheel base and θ the tire turning angle.

[Formula 1]

$$\gamma = \frac{1}{1+SfV^2} \frac{V}{L} \theta \quad (2)$$

Moreover, the vehicle behavior (A+B) is defined as a value measured by a yaw rate sensor.

Moreover, in order to calculate that predicted vehicle motion E which depends on the predicted driver's operation that is predicted to happen in the future after the predetermined time passes, the driver's steering operation in the future after the predetermined time passes is predicted. An average of the driver's steering operation obtained a predetermined time ago from the present time point is defined as $d_n$ and a previous average of the driver's steering operation is defined as $d_{n-1}$. Then, a predicted value $\theta_d$ of the driver's steering operation in the future after the predetermined time passes is given by the following equation (3).

[Formula 2]

$$\theta_d = d_n + \left(\frac{d_n - d_{n-1}}{t}\right)T = d_n + (d_n - d_{n-1})\beta \quad (3)$$

Herein, t denotes a time interval between $d_n$ and $d_{n-1}$ while T denotes a time interval in the future after the predetermined time passes. Into the expression (2), the predicted value $\theta_d$ of the steering operation is substituted as the tire turning angle θ, to thereby calculate the predicted motion of the vehicle E in the future after the predetermined time passes.

Moreover, the vehicle behavior (E+F) in the future after the predetermined time passes is calculated from the motion of the vehicle at each of several past times by a method equivalent to the above equation (3). The motion of the vehicle (E+F) in the future after the predetermined time passes may be calculated by predicting F by inputting E, which was calculated by the equation (3), to a control logic of an actuator.

Similarly, the driver's contribution amount D in driving the vehicle in the longitudinal direction is calculated based on that vehicle motion A which depends on the driver's operation, the vehicle behavior (A+B), the predicted vehicle motion E which depends on the predicted driver's operation that is predicted to happen in the future after a predetermined time passes, and the predicted vehicle behavior (E+F) that is predicted to happen in the future after the predetermined time passes.

At the subsequent step S3, the representation for the information of at least one of the risk and the status of vehicle being controlled is found depending on the driver's contribution amount D in order to transmit the information to the driver via the display device 7. Herein, the driver's contribution amount D is classified into, for example, three levels. For example, 0% to 30% is defined as a low level, 30% to 60% is defined as an intermediate level and 60% to 100% is defined as a high level. Different representations for the information of at least one of the risk or the status of vehicle being controlled are set depending on the different levels of the driver's contribution amount D.

Referring to FIGS. 3 to 8, it is described how to alter the representation for the information of the control status (i.e., the status of the vehicle being controlled) depending on different levels of the driver's contribution amount D.

The representation for each of the different levels of the driver's contribution amount D uses a bird's-eye view of the own vehicle and includes the information of the control status indicating forces acting on the vehicle when various vehicle motion controls work.

When the lane departure prevention control (LDP) works, the display device 7 produces arrows for presenting the control status, that is, the status of the vehicle being controlled by the lane departure prevention control (LDP) as shown in FIG. 3. The arrows are indicative of forces acting on the image of the vehicle in an anti lane departure direction. In this case, the size (including length and thickness) and color of the arrows are altered in accordance with the driver's contribution amount D. For example, when the driver's contribution amount D is at the high level, the risk that a lane departure tendency grows is not high, and the color "blue" is set in the arrows. Moreover, when the driver's contribution amount D is at the intermediate level, the risk that the lane departure tendency grows is rather high, and the color "red" is set in the arrows. Still, when the driver's contribution amount D is at the low level, the risk that the lane departure tendency grows is high, and the color "red" is set in the arrow and the size of the arrows is enlarged.

When the distance control (MB) works to control distance to each of side edges of a lane, the display device 7 produces image of virtual springs protruding outwardly from the lateral sides of the vehicle toward the lane edges as shown in FIG. 4. In this case, the shape and color of the virtual springs are altered depending on the driver's contribution amount D. Each of the virtual springs is represented by a set of straight parallel lines. The straight parallel lines of each set extend in the longitudinal direction of the vehicle and are arranged in an area between the vehicle and the adjacent lane edge in a way that ripples are formed in the area. When the driver's contribution amount D is at the high level, the risk that a tendency to approach the lane edge grows is low and not high, and the color, for example, "aqua blue" is set in the virtual springs. Moreover, when the driver's contribution amount D is at the intermediate level, the risk that the tendency to approach the lane edge grows is rather high, and the color, for example, "yellow" is set in the virtual springs. Still, when the driver's contribution amount D is at the low level, the risk that the tendency to approach the lane edge grows is high. In this case, the color, for example, "yellow" is set in the virtual springs, and the state that one of the virtual springs is compressed between the vehicle and the lane edge is expressed by reducing the intervals between the straight lines for the virtual spring.

When the distance control (MB) works to control distance to an object in the surroundings of the own vehicle, the display device 7 produces virtual springs protruding outwards from four corners of the vehicle in four diagonal directions as shown in FIG. 5. In this case, the shape and color of the virtual springs are altered depending on the driver's contribution amount D. In addition, each of the virtual springs is expressed by a set of arcs. The arcs of each set are arranged in the diagonal direction from the center of the vehicle in a way that ripples are formed. When the driver's contribution amount D is at the high level, the risk that a tendency to approach the object in the surroundings of the vehicle grows is low and not high, the color, for example, "aqua blue" is set in the virtual springs. Moreover, when the driver's contribution amount D is at the intermediate level, the risk that the tendency to approach the object in the surroundings of the vehicle grows is rather high, and the color, for example, "yellow" is set in one or more of the virtual springs arranged in a direction toward the detected object in the surroundings of the vehicle. Still, when the driver's contribution amount D is at the low level, the risk that the tendency to approach the object in the surroundings of the vehicle grows is high. In this case, the color, for example, "yellow" is set in one or more of the virtual springs arranged in a direction toward the detected object in the surroundings of the vehicle and the state that the one or two virtual springs are compressed between the vehicle and the detected object is expressed by reducing the intervals between the arcs arranged in the diagonal direction toward the detected object from the center of the vehicle.

When the vehicle stability control (VDC) works, the display device 7 produces an arrow for presenting the control status, that is, a state of restraining a tendency to oversteer or understeer as shown in FIG. 6. This arrow indicates a direction in which a yaw moment acts on the vehicle to restrain the tendency to oversteer or understeer. In this case, the size (including length and thickness) and color of the arrow are altered depending on the driver's contribution amount D. For example, when the driver's contribution amount D is at the high level, the risk that the tendency to oversteer or understeer grows is low and not high, and the color, for example, "blue" is set in the arrow. Moreover, when the driver's contribution amount D is at the intermediate level, the risk that the tendency to oversteer or understeer grows is rather high, and the color, for example, "red" is set in the arrow. Still, when the driver's contribution amount D is at the low level, the risk that the tendency to oversteer or understeer grows is high. In this case, the color, for example, "red" is set in the arrow and the size of the arrow is enlarged.

When the hill start assist (HSA) control works, the display device 7 produces an arrow for presenting the control status, that is, a state of suppressing rearward movement of the vehicle on a steep upslope as shown in FIG. 7. The arrow is indicative of a force pushing the vehicle from the rear. In this case, the size (including length and thickness) and color of the arrow are altered depending on to the driver's contribution amount D. For example, when the driver's contribution amount D is at the high level, the color, for example, "blue" is set in the arrow. Moreover, when the driver's contribution amount D is at the intermediate level, the color, for example, "red" is set in the arrow. Still, when the driver's contribution amount D is at the low level, the color, for example, "red" is set in the arrow and the size of the arrow is enlarged.

When the hill descent (HDC) control works, the display device 7 produces an arrow for presenting the control status, that is, a state of restraining the vehicle from increasing its speed on a steep downslope, as shown in FIG. 8. The arrow is indicative of a force pulling the vehicle in a rearward direction. In this case, the size (including length and thickness) and color of the arrow are altered depending on the driver's contribution amount D. When the driver's contribution amount D is at the high level, the color, for example, "blue" is set in the arrow. When the driver's contribution amount D is at the intermediate level, the color, for example, "red" is set in the arrow. When the driver's contribution amount D is at the low level, the color, for example, "red" is set in the arrow and the size of the arrow is enlarged.

<<Operation>>

Now, it is assumed that, in a system which combines a plurality of vehicle motion controls including at least two or more of a lane departure prevention (LDP) control, a distance control (MB: Magic Bumper), a stability control (VDC: Vehicle Dynamics Control) and the like, there is any control intervention by one of the plurality of vehicle motion controls from the stage where, for example, risk is low. If, here, representation for the risk and/or the control status (i.e. the status of the vehicle being controlled) is uniform, in some cases related to the vehicle driver, the comprehension of the fact, far from being easy, may be difficult.

According to the first embodiment, when the various vehicle motion controls work, the driver's contribution amount D in driving the vehicle is calculated (step S2), the representation for the information of the control status is determined depending on the driver's contribution amount D, and the control status information is transmitted to the driver via the display device 7 (step S3).

Herein, the driver's contribution amount D is defined as an average of the ratio D1 and the ratio D2, where the ratio D1 is a ratio of the vehicle motion A which depends on driver's operation to the vehicle behavior (A+B) that happens on the vehicle, and the ratio D2 is a ratio of the predicted vehicle motion E which depends on the predicted driver's operation that is predicted to happen in the future after the predetermined time passes to the predicted vehicle behavior (E+F) that is predicted to happen on the vehicle in the future after the predetermined time passes. In this manner, the driver's contribution amount D in driving the vehicle is calculated by simple calculation.

The information of the control status is presented in visual form of the arrow(s) or virtual spring(s) which are indicative of the force acting on the vehicle when the various vehicle motion controls work. With this, the driver can easily comprehend the control state.

The following is description of the visual form in which the information is presented and which is altered depending on the driver's contribution amount D when the various vehicle motion controls work.

At first, when the lane departure prevention (LDP) works, the arrow indicative of the anti lane departure direction is produced as shown in FIG. 3.

In this case, when the driver's contribution amount D is at the high level, the color "blue" is set in the arrow. That is, when the driver's consciousness in driving the vehicle is high, there is no need to call the driver's attention more than necessary. A cold color (blue-based hue, such as, blue and green) is used for presenting the information because the risk that the lane departure tendency grows is low. This makes it possible to call the driver's attention in a proper manner for his/her sense.

Moreover, when the driver's contribution amount D is at the intermediate level, the color "red" is set in the arrow. That is, when the driver's consciousness in driving the vehicle begins to drop, an alarm color (red-based hue, such as, red, orange, and yellow) is used for presenting the information because the risk that the lane departure tendency grows is rather high. This makes it possible to call the driver's attention in a proper manner for his/her sense.

Moreover, when the driver's contribution amount D is at the low level, not only the color "red" is set in the arrow, but also the size of the arrow is enlarged. That is, when the driver's consciousness in driving the vehicle drops, the arrow is emphasized more than it is when the driver's contribution amount D is at the intermediate level because the risk that the lane departure tendency grows is high. This makes it possible to call the driver's attention in a proper manner for his/her sense.

Next, when the distance control (MB) works to control distance to each of side edges of a lane, the display device 7 produces image of virtual springs protruding outwardly from the lateral sides of the vehicle toward the lane edges as shown in FIG. 4.

In this case, when the driver's contribution amount D is at the high level, the color "aqua blue" is set in the virtual springs. That is, when the driver's consciousness in driving the vehicle is high, there is no need to call the driver's attention more than necessary. A cold color (blue-based hue such as blue and green) is used for presenting the information because the risk that the tendency to approach the lane edge grows is low. This makes it possible to call the driver's attention in a proper manner for his/her sense.

Moreover, when the driver's contribution amount D is at the intermediate level, the color "yellow" is set in the virtual springs. That is, when the driver's consciousness in driving the vehicle begins to drop, an alarm color (red-based hue, such as, red, orange and yellow) is used for presenting the information because the risk that the tendency to approach the lane edge grows is rather high. This makes it possible to call the driver's attention in a proper manner for his/her sense.

Moreover, when the driver's contribution amount D is at the low level, not only the color "yellow" is set in the virtual springs but also the compressed state of the virtual springs is expressed. That is, when the driver's consciousness in driving the vehicle drops, the virtual springs are emphasized more than they are when the driver's contribution amount D is at the intermediate level because the risk that the tendency to approach the lane edge grows is high. This makes it possible to call the driver's attention in a proper manner for his/her sense.

When the distance control (MB) works to control distance to an object in the surroundings of the own vehicle, such as, a vehicle traveling in the adjacent lane, the display device 7 produces virtual springs protruding outwards from four corners of the vehicle in four diagonal directions as shown in FIG. 5.

In this case, when the driver's contribution amount D is at the high level, the color "aqua blue" is set in the virtual springs. That is, when the driver's consciousness in driving the vehicle is high, there is no need to call the driver's attention more than necessary. A cold color (blue-based hue, such as, blue and green) is used for presenting the information because the risk that the tendency to approach the object in the surroundings of the vehicle grows is low. This makes it possible to call the driver's attention in a proper manner for his/her sense.

Moreover, when the driver's contribution amount D is at the intermediate level, the color "yellow" is set in the virtual springs. That is, when the driver's consciousness in driving the vehicle begins to drop, an alarm color (red-based hue, such as, red, orange and yellow) is used for presenting the information because the risk that the tendency to approach the object in the surroundings grows is rather high. This makes it possible to call the driver's attention in a proper manner for his/her sense.

Moreover, when the driver's contribution amount D is at the low level, not only the color "yellow" is set in the virtual springs but also the compressed state of the virtual springs is expressed. That is, when the driver's consciousness in driving the vehicle drops, the virtual springs are emphasized more than they are when the driver's contribution amount D is at the intermediate level because the risk that the tendency to approach the object in the surroundings of the vehicle grows is high. This makes it possible to call the driver's attention in a proper manner for his/her sense.

Next, when the stability control (VDC) works, the display device 7 produces an arrow that indicates a direction in which a yaw moment acts on the vehicle as shown in FIG. 6.

In this case, when the driver's contribution amount D is at the high level, the color "blue" is set in the arrow. That is, when the driver's consciousness in driving the vehicle is high, there is no need to call the driver's attention more than necessary. A cold color (blue-based hue, such as, blue and green) is used for presenting the information because the risk that the tendency to oversteer or understeer grows is low. This makes it possible to call the driver's attention in a proper manner for his/her sense.

Moreover, when the driver's contribution amount D is at the intermediate level, the color "red" is set in the arrow. That is, when the driver's consciousness in driving the vehicle begins to drop, an alarm color (red-based hue, such as, red, orange and yellow) is used for presenting the information because the risk that the tendency to oversteer or understeer grows is rather high. This makes it possible to call the driver's attention in a proper manner for his/her sense.

Moreover, when the driver's contribution amount D is at the low level, not only the color "red" is set in the arrow but also the size of the arrow is enlarged. That is, when the driver's consciousness in driving the vehicle drops, the arrow is emphasized more than it is when the driver's contribution amount D is at the intermediate level because the risk that the tendency to oversteer or understeer grows is high. This makes it possible to call the driver's attention in a proper manner for his/her sense.

When the hill start assist (HSA) control works, the display device 7 produces an arrow that is indicative of a force pushing the vehicle from the rear as shown in FIG. 7.

In this case, when the driver's contribution amount D is at the high level, the color "blue" is set in the arrow. That is, when the driver's consciousness in driving the vehicle is high, there is no need to call the driver's attention more than necessary. A cold color (blue-based hue, such as, blue and green) is used for presenting the information because the driver can shift to a rapid acceleration. This makes it possible to call the driver's attention in a proper manner for his/her sense.

Moreover, when the driver's contribution amount D is at the intermediate level, the color "red" is set in the arrow. That is, when the driver's consciousness in driving the vehicle begins to drop, an alarm color (red-based hue, such as, red, orange and yellow) is used for presenting the information because it is likely that the driver's shift to acceleration operation is delayed. This makes it possible to call the driver's attention in a proper manner for his/her sense.

Moreover, when the driver's contribution amount D is at the low level, not only the color "red" is set in the arrow but also the size of the arrow is enlarged. That is, when the driver's consciousness in driving the vehicle drops, the arrow is emphasized more than it is when the driver's contribution amount D is at the intermediate level because it is highly likely that the driver's shift to acceleration operation is delayed. This makes it possible to call the driver's attention in a proper manner for his/her sense.

When the hill descent (HDC) control works, the display device 7 produces an arrow that is indicative of a force pulling the vehicle in a rearward direction as shown in FIG. 8.

In this case, when the driver's contribution amount D is at the high level, the color "blue" is set in the arrow. That is, when the driver's consciousness in driving the vehicle is high, there is no need to call the driver's attention more than necessary. A cold color (blue-based hue, such as, blue and green) is used for presenting the information because the risk that the tendency for the vehicle to increase its speed grows is low. This makes it possible to call the driver's attention in a proper manner for his/her sense.

Moreover, when the driver's contribution amount D is at the intermediate level, the color "red" is set in the arrow. That is, when the driver's consciousness in driving the vehicle begins to drop, an alarm color (red-based hue, such as, red, orange and yellow) is used for presenting the information because the risk that the tendency for the vehicle to increase its speed grows is rather high. This makes it possible to call the driver's attention in a proper manner for his/her sense.

Moreover, when the driver's contribution amount D is at the low level, not only the color "red" is set in the arrow but also the size of the arrow is enlarged. That is, when the driver's consciousness in driving the vehicle drops, the arrow is emphasized more than it is when the driver's contribution amount D is at the intermediate level because the risk that the tendency for the vehicle to increase its speed grows is high. This makes it possible to call the driver's attention in a proper manner for his/her sense.

Application Examples

Moreover, according to the first embodiment, the average of D1 and D2 is calculated as the driver's contribution amount D. Otherwise, an addition of D1 and D2, a select-low of D1 and D2, or an addition of weighted D1 and weighted D2 may be defined as the driver's contribution amount D. Furthermore, any one of D1 and D2 per se may be defined as the driver's contribution amount D.

Figure 9:
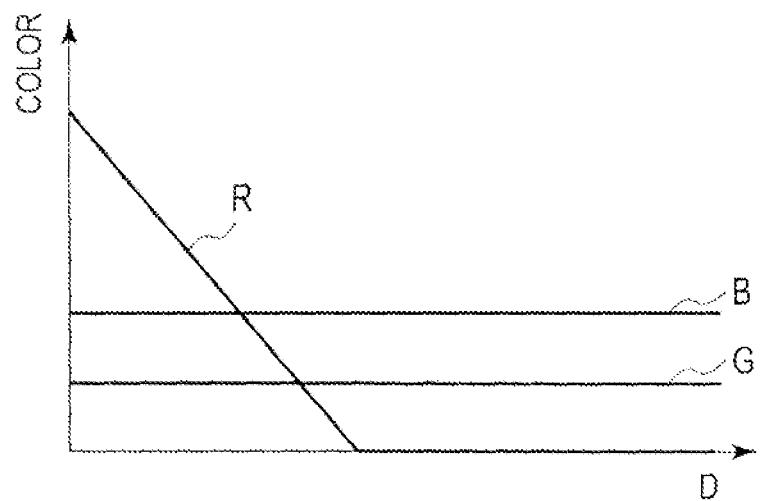
FIG. 9 shows a map used for determining additive mixture of colors of an operating state indicator in accordance with the driver's contribution amount.

Moreover, according to the first embodiment, the driver's contribution amount D is divided into three levels including the high level, the intermediate level and the low level, thereby varying the visual form of the operating indicators such as arrow and spring. However, the visual form may be segmentalized (subdivided). When, for example, the operating indicator is displayed by additive color mixture, that is, three primary colors of light, as shown in FIG. 9, the visual form may be changed continuously (no step) by making the red denser (stronger) as the driver's contribution amount D is lower. This makes it possible to adjust the visual form in detail.

Figure 10:
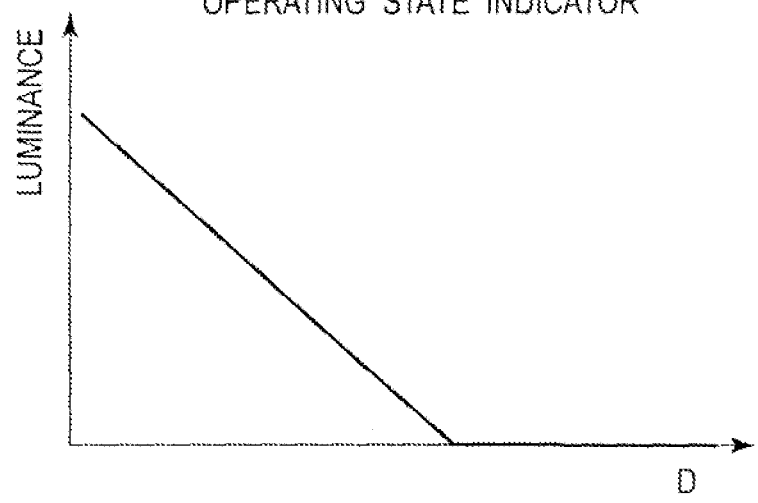
FIG. 10 shows a map used for determining luminance of the operating state indicator in accordance with the driver's contribution amount.
Figure 11:
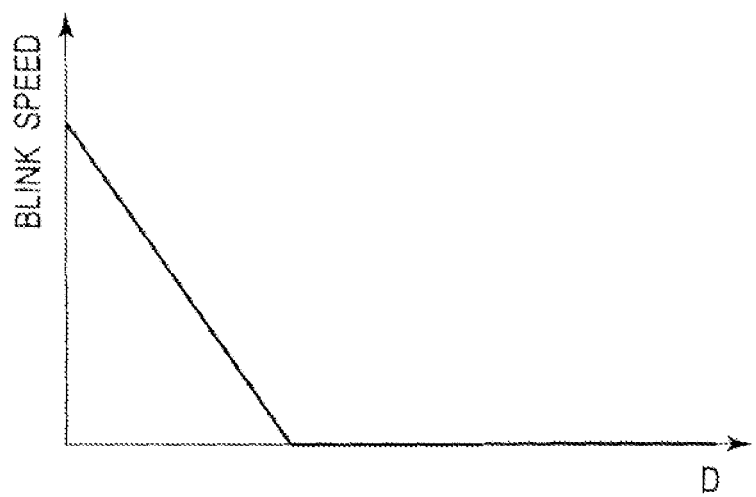
FIG. 11 shows a map used for determining blink speed of the operating state indicator in accordance with the driver's contribution amount.

Moreover, according to the first embodiment, the color of the operating indicator such as arrow and spring is changed in accordance with the driver's contribution amount D. Otherwise, luminance or blink speed of the operating indicator may be changed. That is, as shown in FIG. 10, the luminance of the operating indicator may be higher as the driver's contribution amount D is lower. Moreover, as shown in FIG. 11, the blink speed of the operating indicator may be higher as the driver's contribution amount D is lower. This makes it possible to arbitrarily adjust emphasis degree of the operating indicator, thus making it possible to call the driver's attention in a proper manner for the driver's sense.

Figure 12:
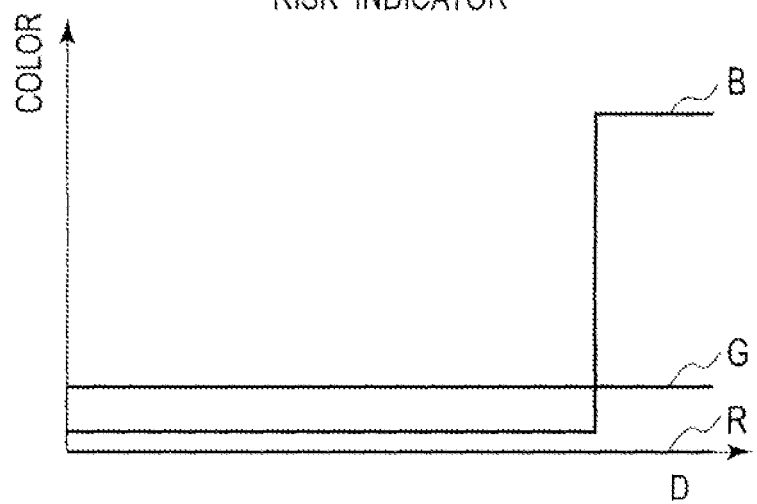
FIG. 12 shows a map used for determining additive mixture of colors of the risk indicator in accordance with the driver's contribution amount.
Figure 13:
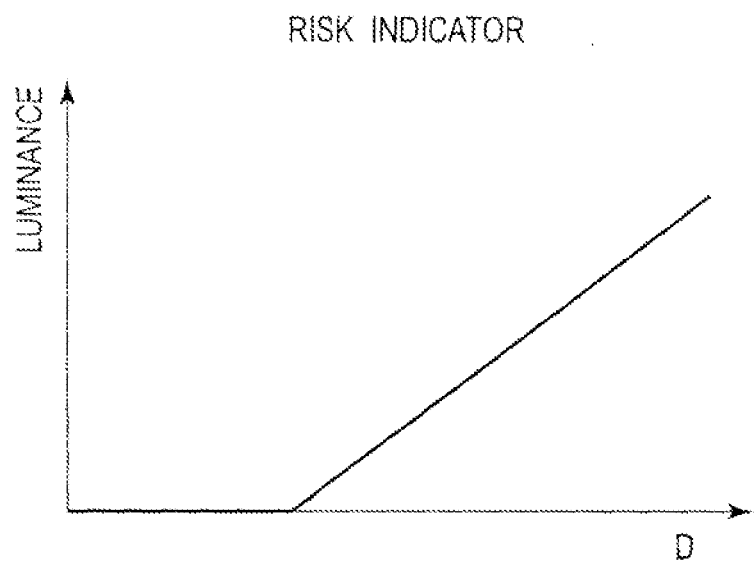
FIG. 13 shows a map used for determining luminance of the risk indicator in accordance with the driver's contribution amount.
Figure 14:
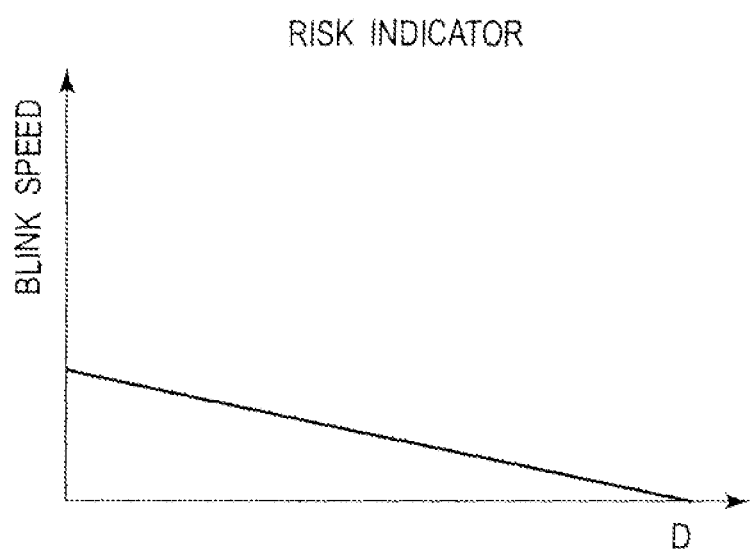
FIG. 14 shows a map used for determining blink speed of the risk indicator in accordance with the driver's contribution amount.

Moreover, according to the first embodiment, the visual form of only the operating indicator is changed in accordance with the driver's contribution amount D, however, altering the visual form of a risk indicator which displays a risk of the vehicle driving is allowed. That is, the lane may be defined as the risk indicator in the lane departure prevention control (LDP), the surrounding object may be defined as the risk indicator in the inter-vehicular distance control (MB), and the own vehicle per se may be defined as the risk indicator in the stability control (VDC). Generally, the higher the driver's contribution amount D is, the more pieces of visual information the driver can obtain. Thus, as shown in FIG. 12, effectively having the driver recognize the risk indicator which is a risk for the own vehicle is allowed, by making blue (of the three primary colors displaying the risk indicator) stronger as the driver's contribution amount D is higher. Moreover, as shown in FIG. 13, effectively having the driver recognize the risk indicator which is a risk for the own vehicle is allowed, by making the luminance of the risk indicator higher as the driver's contribution amount D is higher. However, as the driver's contribution amount D is lower, it is more likely that the risk is higher. Therefore, as shown in FIG. 14, it is allowed to take the following steps: increasing the blink speed, thereby emphasizing the risk indicator which is a risk for the own vehicle, and calling the driver's attention in a proper manner for the driver's sense.

<<Effect>>

As stated above, the controller 10 corresponds to "control," the display device 7 corresponds to "display device," the process at step S2 corresponds to "calculating unit" and the process at step S3 corresponds to "altering unit." Moreover, the arrows in FIG. 3 and FIG. 6 to FIG. 8 and the virtual springs in FIG. 4 and FIG. 5 correspond to "operating indicator."

(1) A driver assistance system includes: a plurality of vehicle motion controls, each being constructed to work for controlling a vehicle upon detecting risk during driving the vehicle; a display device constructed to present information, in visual form, of at least one of the risk and operating states of the plurality of vehicle motion controls when at least one of the plurality of vehicle motion controls works; a calculating unit constructed to calculate the driver's contribution amount in driving the vehicle; and an altering unit constructed to alter the visual form, in which the information is presented, depending on the driver's contribution amount calculated by the calculating unit.

With this, altering the visual form in which the information is presented in accordance with the driver's contribution amount D can present at least one of the risk and the control state more effectively than when uniformly presenting the visual information. Thus, the driver can easily understand the situation.

(2) The calculating unit calculates the driver's contribution amount based on a ratio of that motion of the vehicle which depends on driver's operation to the vehicle behavior.

With this, an easy calculation can calculate the driver's contribution amount D in driving the vehicle.

(3) The calculating unit calculates the driver's contribution amount based on a ratio of that predicted motion of the vehicle which depends on driver's operation that is predicted to happen in the future after a predetermined time passes to the vehicle behavior that is predicted to happen in the future after the predetermined time passes.

With this, an easy calculation can calculate the driver's contribution amount D in driving the vehicle.

(4) The display device presents, in visual form of an operating state indicator, the force acting on the vehicle when the vehicle motion control works, and the altering unit alters the operating state indicator in such a way that the lower the driver's contribution amount becomes, the larger the operating state indicator becomes in size.

This makes it possible to call the driver's attention in a proper manner for the driver's sense.

(5) The display device presents, in visual form of an operating state indicator, the force acting on the vehicle when the vehicle motion control works, and the altering unit alters the operating state indicator in such a way that the lower the driver's contribution amount becomes, the more red, which is selected out of the three primary colors used to express the operating state indicator, becomes deepened.

This makes it possible to call the driver's attention in a proper manner for the driver's sense.

(6) The display device presents, in visual form of an operating state indicator, the force acting on the vehicle when the vehicle motion control works, and the altering unit alters the operating state indicator in such a way that the lower the driver's contribution amount becomes, the higher luminance of the operating state indicator becomes.

This makes it possible to call the driver's attention in a proper manner for the driver's sense.

(7) The display device presents, in visual form of an operating state indicator, the force acting on the vehicle when the vehicle motion control works, and the altering unit alters the operating state indicator in such a way that the lower the driver's contribution amount becomes, the higher blink speed of the operating state indicator becomes.

This makes it possible to call the driver's attention in a proper manner for the driver's sense.

(8) The display device presents, in visual form of a risk indicator, the risk during driving the vehicle, and the altering unit alters the risk indicator in such a way that the higher the driver's contribution amount becomes, the more blue, which is selected out of the three primary colors used to express the risk indicator, becomes deepened.

This makes it possible to effectively have the driver recognize the situation which is a risk for the own vehicle.

(9) The display device presents, in visual form of a risk indicator, the risk during driving the vehicle, and the altering unit alters the risk indicator in such a way that the higher the driver's contribution amount becomes, the higher luminance of the risk indicator becomes.

This makes it possible to effectively have the driver recognize the situation which is a risk for the own vehicle.

(10) The display device presents, in visual form of a risk indicator, the risk during driving the vehicle, and the altering unit alters the risk indicator in such a way that the lower the driver's contribution amount becomes, the higher blink speed of the risk indicator becomes.

This makes it possible to call the driver's attention in a proper manner for the driver's sense.

(11) A driver assistance method includes: controlling a vehicle upon detecting risk during driving the vehicle; presenting information, in visual form, of at least one of the risk during driving the vehicle and the status of the vehicle being controlled; calculating the driver's contribution amount in driving the vehicle; and altering the visual form, in which the information is presented, depending on the calculated driver's contribution amount.

With this, altering the visual form in which the information is presented in accordance with the driver's contribution amount D can display the risk and control state more effectively than when uniformly displaying the visual information. Thus, the driver can easily understand the situation.

Second Embodiment

Structure

According to the second embodiment, another calculation method of the driver's contribution amount D is to be set forth.

Figure 15:
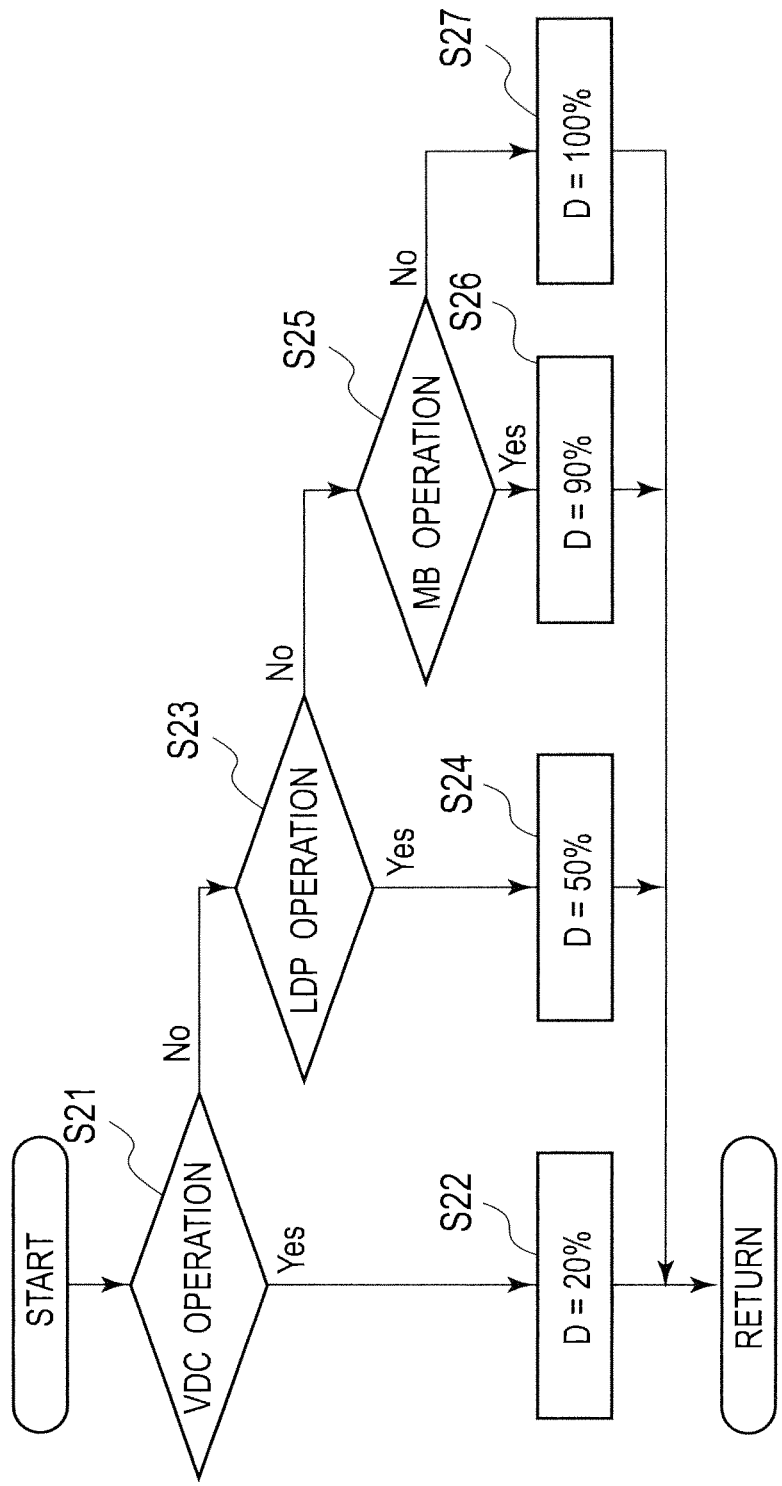
FIG. 15 is a flowchart showing representation control processing according to the second embodiment.

FIG. 15 is a flowchart showing processing for calculating the driver's contribution amount.

At first, at step S21, the process determines whether or not the stability control (VDC) is operating. When the stability control is operating, the process moves to step S22. Meanwhile, when the stability control is not operating, the process moves to step S23.

At step S22, the process predicts that the driver's contribution amount D=20% and then returns to a predetermined main program.

At step S23, the process determines whether or not the lane departure prevention control (LDP) is operating. When the lane departure prevention control is operating, the process moves to step S24. Meanwhile, when the lane departure prevention control is not operating, the process moves to step S25.

At step S24, the process predicts that the driver's contribution amount D=50% and then returns to the predetermined main program.

At step S25, the process determines whether or not the inter-vehicular distance control (MB) is operating. When the inter-vehicular distance control is operating, the process moves to step S26. Meanwhile, when the inter-vehicular distance control is not operating, the process moves to step S27.

At step S26, the process predicts that the driver's contribution amount D=90% and then returns to the predetermined main program.

At step S27, the process predicts that the driver's contribution amount D=100% and then returns to the predetermined main program.

<<Operation>>

The driver's contribution amount D to the vehicle driving can be estimated to a certain extent from the operating state of each control. For example, when only the inter-vehicular distance control (MB) is operating, it is estimated that the driver's contribution amount D is at relatively high level; when the lane departure prevention control (LDP) works, it is estimated that the driver's contribution amount D is lowered to the intermediate level; and when the stability control (VDC) works, it is estimated that the driver's contribution amount D is lowered to the low level. That is, determining in advance the relation between the operation of each control and the driver's contribution amount D can calculate (estimate) the driver's contribution amount D according to the operating state of each control. In this way, an easy method can calculate the driver's contribution amount D in driving the vehicle.

Figure 16:
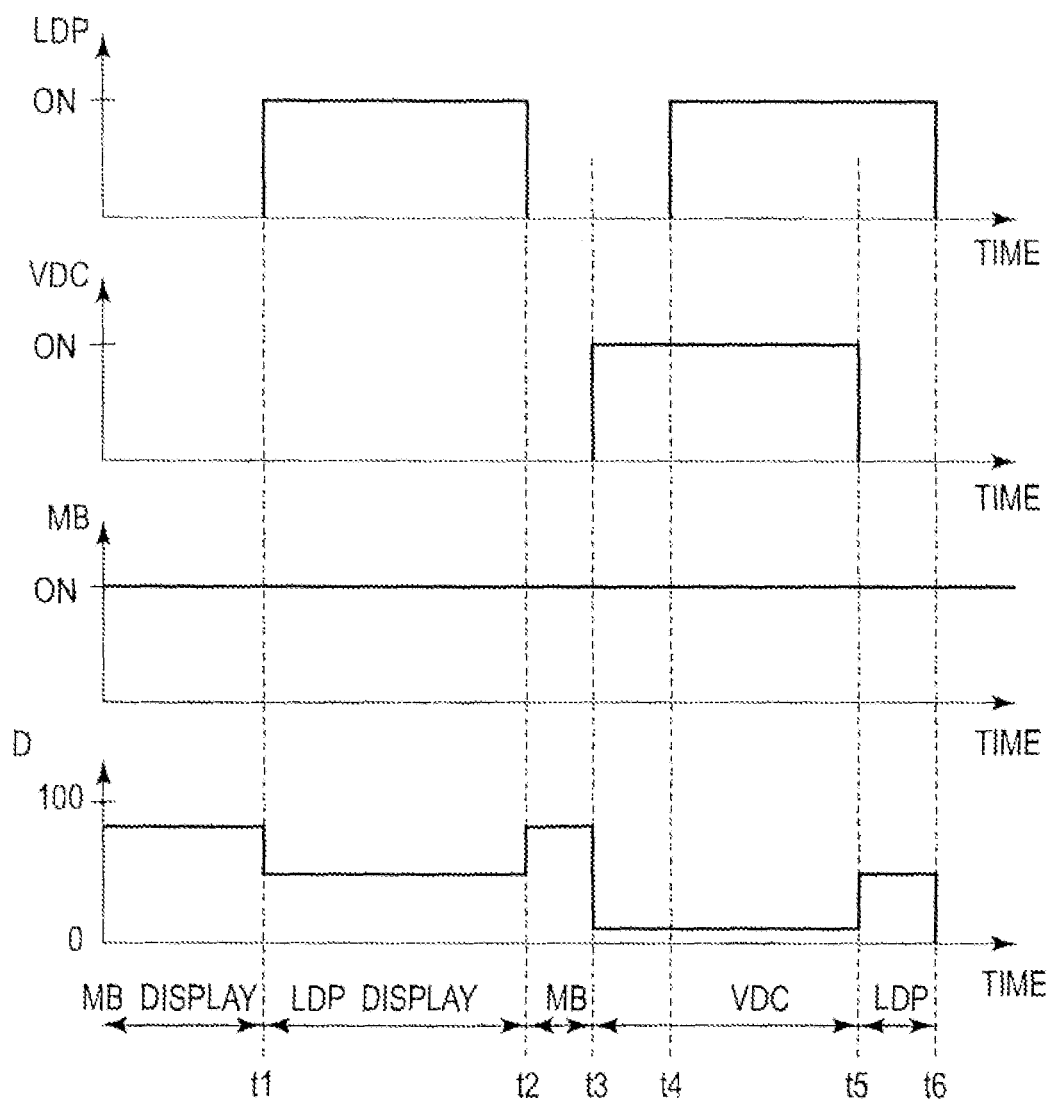
FIG. 16 is timing chart illustrating how the driver's contribution amount D varies.

Moreover, when a plurality of controls simultaneously operate, as shown in FIG. 16, for setting the driver's contribution amount D, the lane departure prevention control (LDP) is prioritized over the inter-vehicular distance control (MB) and the stability control (VDC) is prioritized over the LDP control.

At first, when the MB is operating, the driver's contribution amount D is 90%, displaying the MB control state as visual information. Then, when the LDP is operating from time point t1 to time point t2, the LDP is prioritized and the imitative D is 50%, thus switching the visual information display to the LDP control state. Moreover, when the LDP is not operating from time point t2 to time point t3, the driver's contribution amount D returns to 90%, thus switching the visual information display to the MB control state. Moreover, when the VDC is operating from time point t3 to time point t5, the VDC is prioritized and the driver's contribution amount D is set to 20%, thus switching the visual information display to the VDC control state. Even when the LDP works from time point t4 to time point t6, the visual information display is maintained in the VDC control state from time point t4 to time point t5 when the VDC is operating; and then, from time point t5 to time point t6 when the VDC is inoperative, the visual information display is switched to the LDP control state.

Application Example

Figure 17:
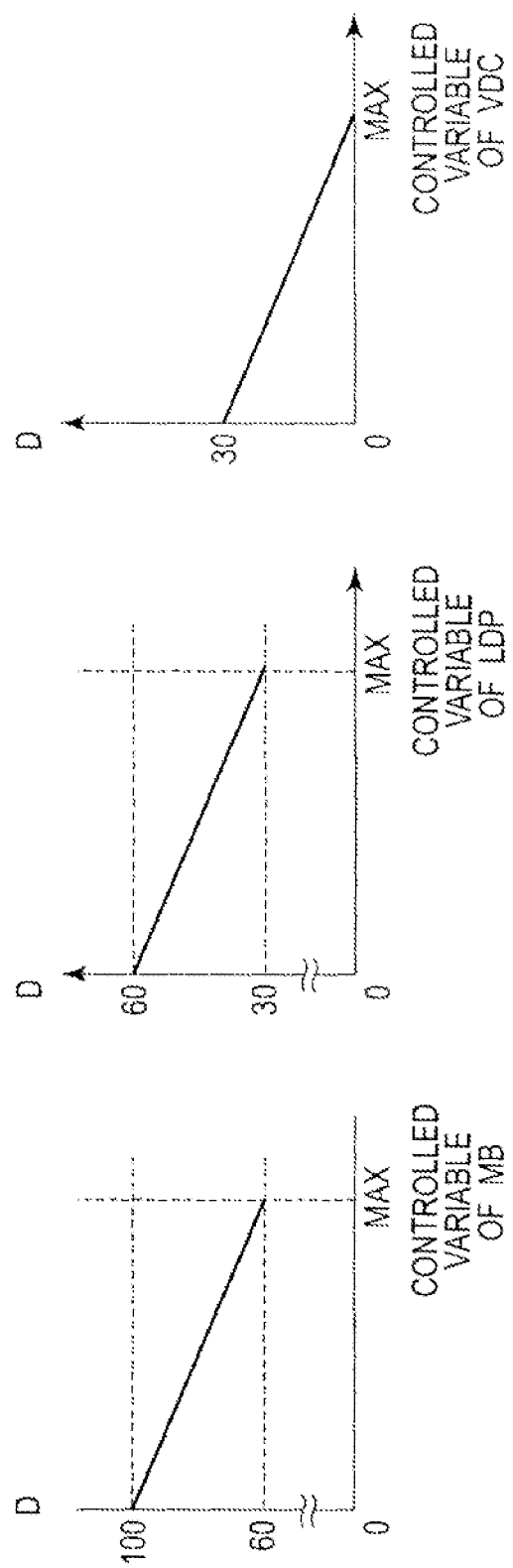
FIG. 17 shows maps, each being used for determining the driver's contribution amount D against a controlled variable of the corresponding one of different vehicle motion controls.

In addition, according to the second embodiment, the approximate number of the driver's contribution amount D is estimated based merely on the operating state (ON/OFF) of each control. However, the driver's contribution amount D may be estimated more in detail based on each controlled variable (control amount). That is, as shown in FIG. 17, at first, when the MB alone works, the driver's contribution amount D is set in a range of 60% to 100%; when the LDP works, the driver's contribution amount D is set in a range of 30% to 60%; and when the VDC works, the driver's contribution amount D is set in a range of 0% to 30%. Then, when the controlled variable by the MB increases from 0 to the maximum, the process sets the driver's contribution amount D to be decreased from 100 to 60. Moreover, when the controlled variable by the LDP increases from 0 to the maximum, the process sets the driver's contribution amount D to be decreased from 60 to 30. Moreover, when the controlled variable by the VDC increases from 0 to the maximum, the process sets the driver's contribution amount D to be decreased from 30 to 0. With these operations, the process can estimate the imitative D more accurately and precisely.

<<Effect>>

As set forth above, the processes at step S21 to step S27 correspond to "calculating unit."

(1) The calculating unit predetermines a relationship between the operating state of each of the plurality of vehicle motion controls and the driver's contribution amount, and calculates the driver's contribution amount depending on the operating state of the vehicle motion control. With this, an easy method can calculate the driver's contribution amount D to the vehicle driving.

(2) The calculating unit calculates the driver's contribution amount depending on controlled variable when the vehicle motion control works.

With this, the driver's contribution amount D can be calculated more accurately and precisely.

Third Embodiment

Structure

According to the third embodiment, the display area is changed in accordance with the driver's contribution amount D.

Figure 18:
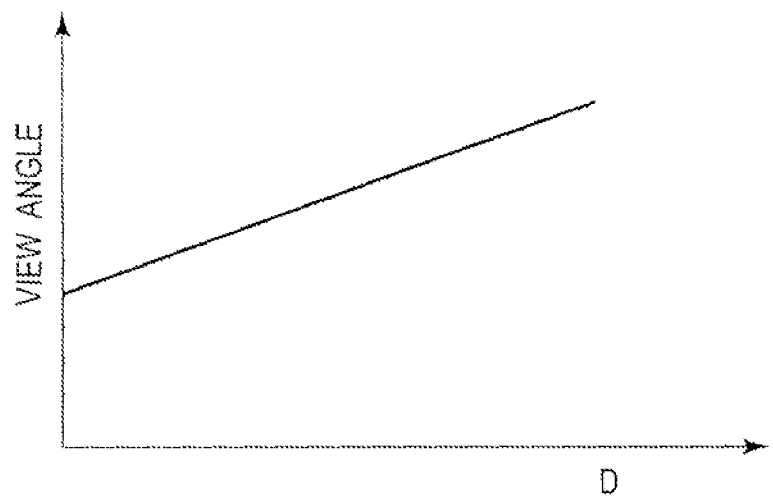
FIG. 18 shows a map used for determining a view angle in accordance with the driver's contribution amount D.

That is, before implementation of the process at step S3 set forth above, referring to a map in FIG. 18, a display image angle (view angle) is to be determined in accordance with the driver's contribution amount D. In this map, the lower the driver's contribution amount D is, the narrower the display image angle around the own vehicle is set, that is, the own vehicle is displayed by zoom up (magnification).

<<Operation>>

In general, the higher the driver's contribution amount D, the more pieces of visual information the driver can obtain. Thus, the higher the driver's contribution amount D, the wider the display image angle is set, thus making it possible to provide many pieces of information. On the other hand, the lower the driver's contribution amount D is, the narrower the display image angle is set, thereby limiting only to the information that is now most desired to be recognized by the driver, thus making it possible to call the driver's attention in a proper manner for the driver's sense.

<<Effect>>

(1) The lower the driver's contribution amount D becomes, the more the display device magnifies the vehicle.

This makes it possible to call the driver's attention in a proper manner for the driver's sense.

Fourth Embodiment

Structure

The fourth embodiment provides another visual form in which the information is presented.

That is, the information is presented in visual form that varies with time line. The fourth embodiment is explained based on the LDP control.

At first, FIG. 19 shows the future state denoting the risk of the vehicle driving. That is, the future risk that the own vehicle may depart from the lane is presented in the form of a blue frame within an area lying diagonally in front of the own vehicle. In this case, like the risk indicator shown as the application example of the first embodiment, the higher the driver's contribution amount D, the thicker the blue frame becomes.

Then, FIG. 20 shows the present state indicating the vehicle motion caused due to the operation of the IDP control. That is, an arrow oriented in an anti-lane-departure direction is used to indicate the state that the own vehicle's tendency of departure from the lane is restrained, and the size (including length and thickness) or color of the arrow is altered depending on the driver's contribution amount D. For example, when the driver's contribution amount D is at the high level, the risk that the vehicle tends to depart from its lane is not high, therefore. "blue", for example, is set in the arrow. Moreover, when the driver's contribution amount D is at the intermediate level, the risk that the vehicle tends to depart from its lane is rather high, therefore, "red", for example, is set in the arrow. Then, when the driver's contribution amount D is at the low level, the risk that the vehicle tends to depart from its lane is high, therefore, "red", for example, is set in the arrow and the size of the arrow is enlarged.

Moreover, FIG. 21 shows the past state indicating the operation of the LDP control. Herein, the past state shows a reason for providing the state in FIG. 20, that is, showing a state before providing the state in FIG. 20. Specifically, for example, when the own vehicle has a tendency to make a leftward departure, a yaw moment is applied in the rightward direction by means of the brake force difference between the right and left wheels, thus, the state that the brake force is applied to the right wheel is denoted by an arrow in the rearward direction of the right wheel's tire, and in accordance with the driver's contribution amount D the size (including length and thickness) and color of the arrow are altered. For example, when the driver's contribution amount D is at the high level, the risk of increased tendency for lane departure is not high, therefore, "blue", for example, is set in the arrow. Moreover, when the driver's contribution amount D is at the intermediate level, the risk of increased tendency for lane departure is rather high, therefore, "red", for example, is set in the arrow. Still, when the driver's contribution amount D is at the low level, the risk of increased tendency for lane departure is high, therefore, "red", for example, is set in the arrow and the size of the arrow is enlarged.

<<Operation>>

According to the fourth embodiment, the visual form in which the information is presented is varied with time and any one of the future state, present state and past state is presented. In this way, preparing various visual forms can vary the visual form in which the information is presented to meet the driver's preference and provide appropriate presentation of information to the in-situ state.

Application Example

Figure 22:
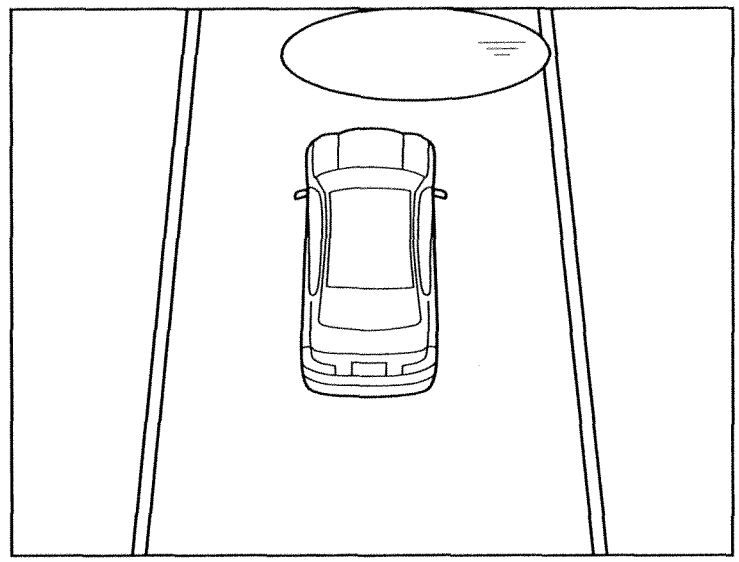
FIG. 22 illustrates, as an example, the representation of a road surface with a low coefficient of friction.
Figure 23:
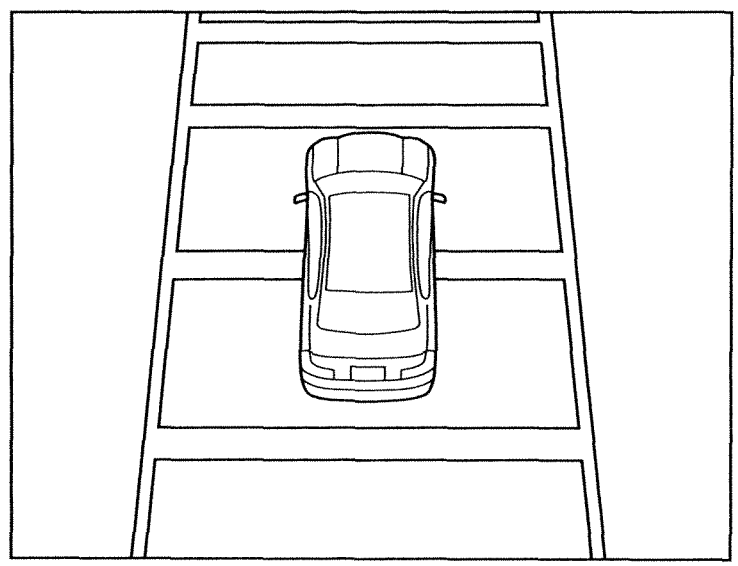
FIG. 23 illustrates, as an example, the representation of school zone.

In addition, when a road surface (having a low frictional coefficient μ) or a school zone is detected, the information may be presented in various visual forms. For example, when the information of the road surface having a low frictional coefficient μ(such as puddle) is obtained from an infrastructure, as shown in FIG. 22, a diagram of the puddle is to be displayed ahead of the own vehicle. Moreover, when the school route information is obtained from the navigation system, a road diagram different from that of the general road (non-school zone) is to be displayed, or as shown in FIG. 23, a sign diagram of the school zone is to be displayed. With this, the driver can be assisted in various driving scenes.

<<Effect>>

(1) The display device presents any one of the future state of the risk during driving the vehicle, the present state of that motion of the vehicle which depends on the operating state of the vehicle motion control and the past state of the operating state of the vehicle motion control.

This makes it possible to alter the visual form in which the information is presented to meet the driver's preference and to provide information suitable for the in-situ state.

Fifth Embodiment

Structure

According to the fifth embodiment, when the driver is concentrated on the driving, the display content is altered such that unnecessary information is not presented.

Figure 24:
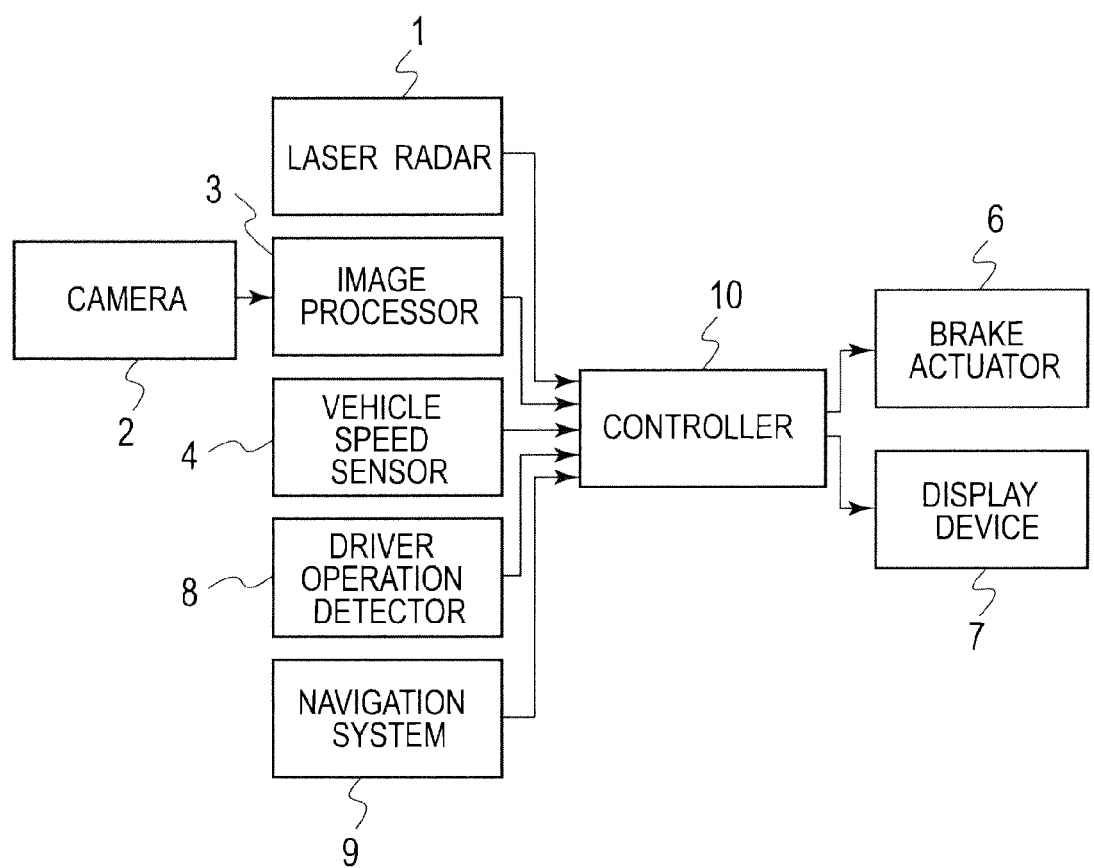
FIG. 24 is a schematic diagram of a driver assistance system.

FIG. 24 is a schematic of a driving assistance system.

Herein, other than addition of a driver operation detector 8 and a navigation system 9, FIG. 24 is the same as FIG. 1 in structure, thus, explanations about the common structures are to be omitted.

At first, the driver operation detector 8 detects various operating states of the driver, such as accelerator operation, braking operation, shift operation, steering operation, navigation operation, and meters operation, then, the driver operation detector 8 inputs such data in the controller 10. Moreover, to the controller 10, the navigation system 9 inputs the own vehicle's present location as well as the map information and road information around the own vehicle's present location. In addition, from an FM multiplex broadcast or an optical-radio wave beacon, the navigation system 9 receives traffic information around the own vehicle, by using vehicle information and communication system (VICS).

Figure 25:
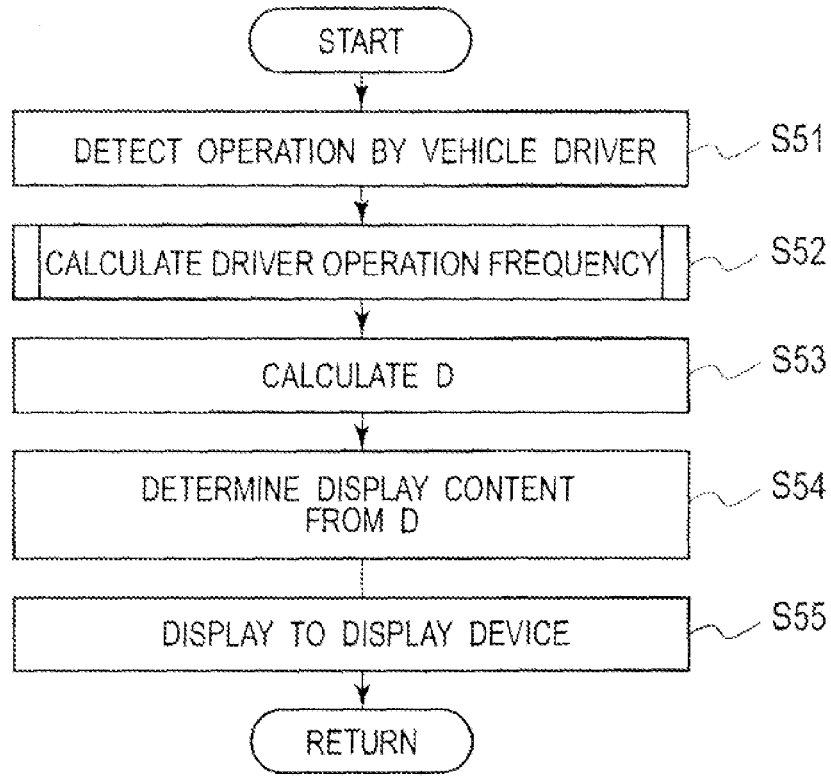
FIG. 25 is a flowchart showing representation control processing according to the fifth embodiment.

FIG. 25 is a flowchart showing a representation control processing according to the fifth embodiment.

At first, at step S51, the process detects various operating states of the driver.

Then, at the subsequent step S52, the process calculates a frequency h of each of the various operations of the driver.

From a ratio that any of the operations (such as the driver's acceleration operation, braking operation, shift operation, steering operation, navigation operation, and meters operation) is implemented in a predetermined period (for example, from operation start to present), the driver operation frequency h is calculated by the following expression. In this case, temporal differential value of operation amount is more than or equal to a predetermined value. Herein, when any of the operations is implemented, X=1, and when none of the operations is implemented. X=0. The operation frequency h is calculated in a range of 0≤h≤1.0.

[Formula 3]

$$h = \frac{\sum_{i=0}^{n} X_i}{n}$$

Figure 26:
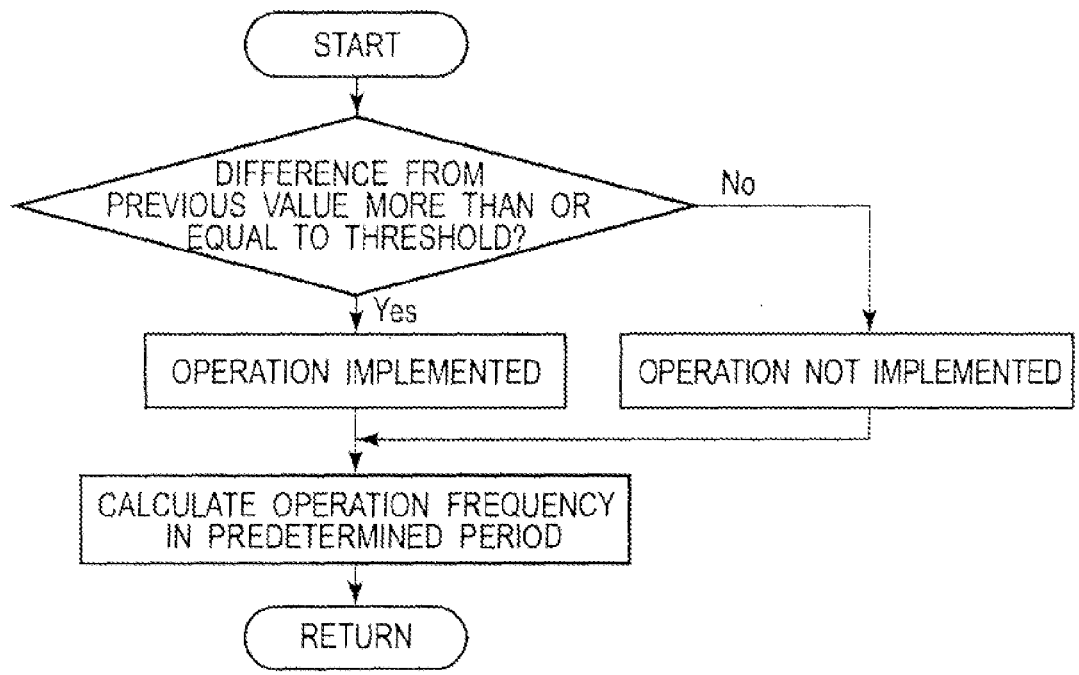
FIG. 26 illustrates an example of a flowchart showing the processing to calculate the frequency of vehicle driver operation.

FIG. 26 is an example of a flowchart showing an operation frequency calculation process.

As shown in FIG. 26, only when the difference from the previous value is more than or equal to a threshold, the process determines that the operation is implemented, thus calculating the operation frequency in the predetermined period.

At the subsequent step S53, the process calculates the driver contribution amount D according to the operation frequency h.

Herein, when the driver operation frequency h is larger than a preliminarily calculated adequate frequency H (for example, 0.7), the process calculates the driver's contribution amount D according to the following expression.

$$D=100-a(h-H)[\%]$$

On the other hand, when the driver operation frequency h is smaller than the preliminarily calculated adequate frequency H, the process calculates the driver's contribution amount D according to the following expression.

$$D=100-b\cdot(H-h)[\%]$$

The above "a" and "b" are each coefficient, with a relation a<b. It is so set that the lower the operation frequency h is, the lower the driver's contribution amount D is. Each of the coefficients "a" and "b" is in a range of 10 to 100, for example, the coefficient a=50 and the coefficient b=100.

Moreover, when the operation frequency h is the same as the adequate frequency H, the driver's contribution amount D is set to 100 as given by the following expression.

$$D=100[\%]$$

Figure 27:
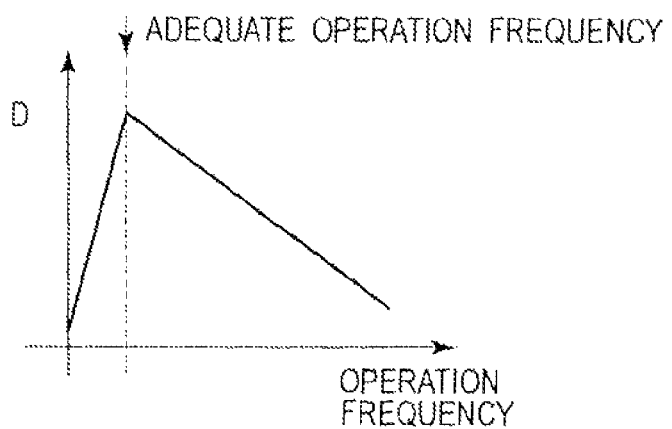
FIG. 27 is a graphical representation for the relationship between the frequency of vehicle driver operation and the driver's contribution amount.

FIG. 27 is a graph showing the relation between the operation frequency and the driver's contribution amount.

As shown in FIG. 27, when the operation frequency h coincides with the adequate frequency H, the driver's contribution amount D is at the maximum.

In addition, the adequate frequency H may have a predetermined scope instead of being unique. In this case, the adequate frequency H is in a range of Hl<H<Hh, for example, Hl=0.6 and Hh=0.8.

Herein, when the driver operation frequency h is larger than an upper limit Hh of the preliminarily calculated adequate frequency H, the driver's contribution amount D is calculated according to the following expression.

$$D=100-a\cdot(h-Hh)[\%]$$

On the other hand, when the driver operation frequency h is smaller than a lower limit Hl of the preliminarily calculated adequate frequency H, the driver's contribution amount D is calculated according to the following expression.

$$D=100-b\cdot(Hl-h)[\%]$$

In addition, when the operation frequency is in a range of Hl≤h≤Hh, the driver's contribution amount D is set to 100 as shown by the following expression.

$$D=100[\%]$$

Figure 28:
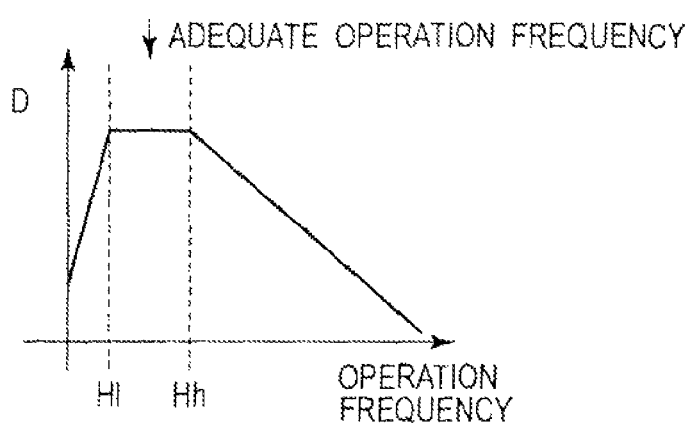
FIG. 28 is a graphical representation for the relationship between the frequency of vehicle driver operation and the driver's contribution amount.

FIG. 28 is a graph showing the relation between the operation frequency h and the driver's contribution amount D.

As shown in FIG. 28, when the operation frequency h is in the adequate frequencies H to Hh, the driver's contribution amount D is at the maximum.

Moreover, other than the above description, the following calculation is allowed: a map for calculating the driver's contribution amount D is provided in advance, then, with the driver operation frequency h as input, the driver's contribution amount D is calculated from the map.

Figure 29:
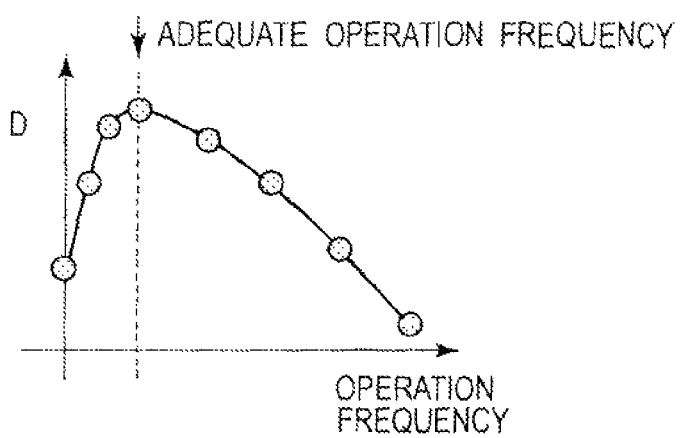
FIG. 29 shows a map used for calculating the driver's contribution amount.

FIG. 29 is a map used for calculating the driver's contribution amount D.

By referring to such map, the driver's contribution amount D may be calculated according to the operation frequency h.

At the subsequent step S54, the visual form which is in accordance with the driver's contribution amount D is to be determined.

Figure 30:
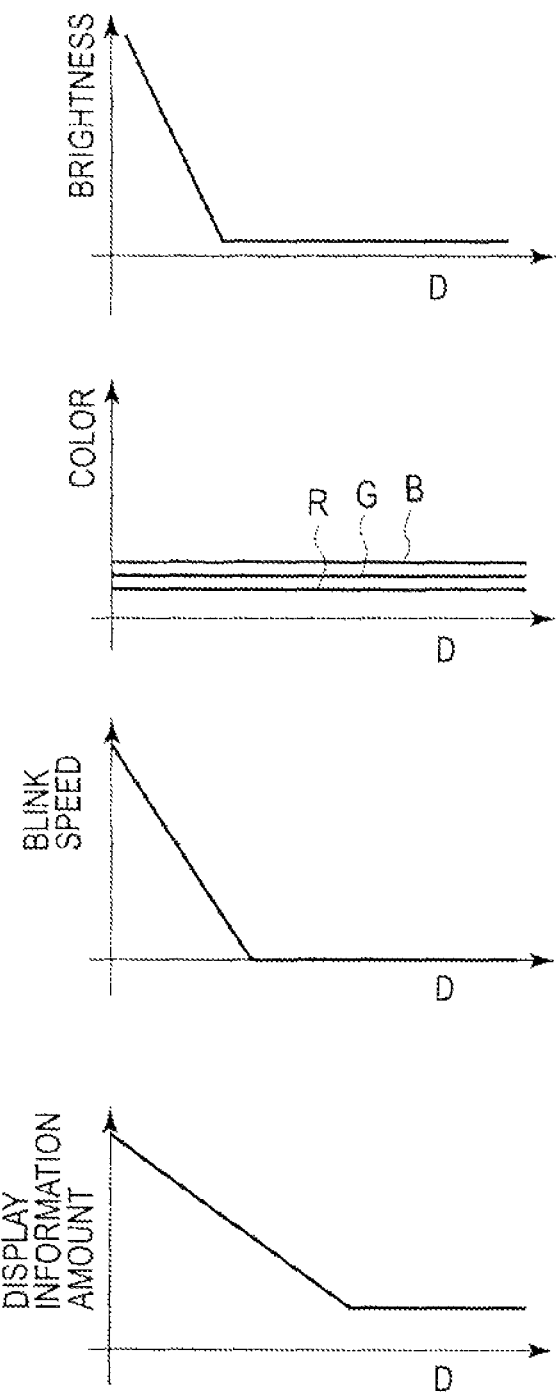
FIG. 30 shows various maps, each being used for determining the visual form which is in accordance with the driver's contribution amount.

FIG. 30 shows various maps for determining the visual form which is in accordance with the driver's contribution amount D.

As shown in FIG. 30, the brightness, additive color mixing, blink speed, display information amount are to be determined in accordance with the driver's contribution amount D. For example, the higher the driver's contribution amount D is, the more suppressed the brightness, blink speed and display information amount are.

At the subsequent step S55, the process supplies the information to the driver via the display device 7 according to the determined visual form and then returns to the predetermined main program.

In addition, the display viewpoint may be adjusted in accordance with the driver's contribution amount D.

<<Operation>>

It is assumed that the closer the driver operation frequency h is to the adequate frequency H, the more concentrated the driver is on the driving. Thus, the process calculates the driver's contribution amount D according to the operation frequency h (step S53) and changes the visual form according to the thus calculated driver's contribution amount D (steps S54 and S55). For example, the higher the driver's contribution amount D is, the more suppressed the brightness, blink speed, and display information amount are. That is, when the driver's contribution amount D is high, the process interprets that a positive (aggressive) display is not necessary, thus setting the entire display image rather dark, setting the color combination of display content rather dark, and setting the display information amount small.

In this way, in the scene where the driver is concentrated on the driving, only the necessary information such as the system's operating state can be displayed.

<<Effect>>

(1) The calculating unit calculates the frequency of driver's operation h and calculates the driver's contribution amount D depending on the calculated frequency h.

With this, the driver's contribution amount D to the vehicle driving can be calculated in a wider scene and by simple calculations.

Sixth Embodiment

Structure

In the sixth embodiment, the process calculates the driver's contribution amount D from the driver's intention.

Figure 31:
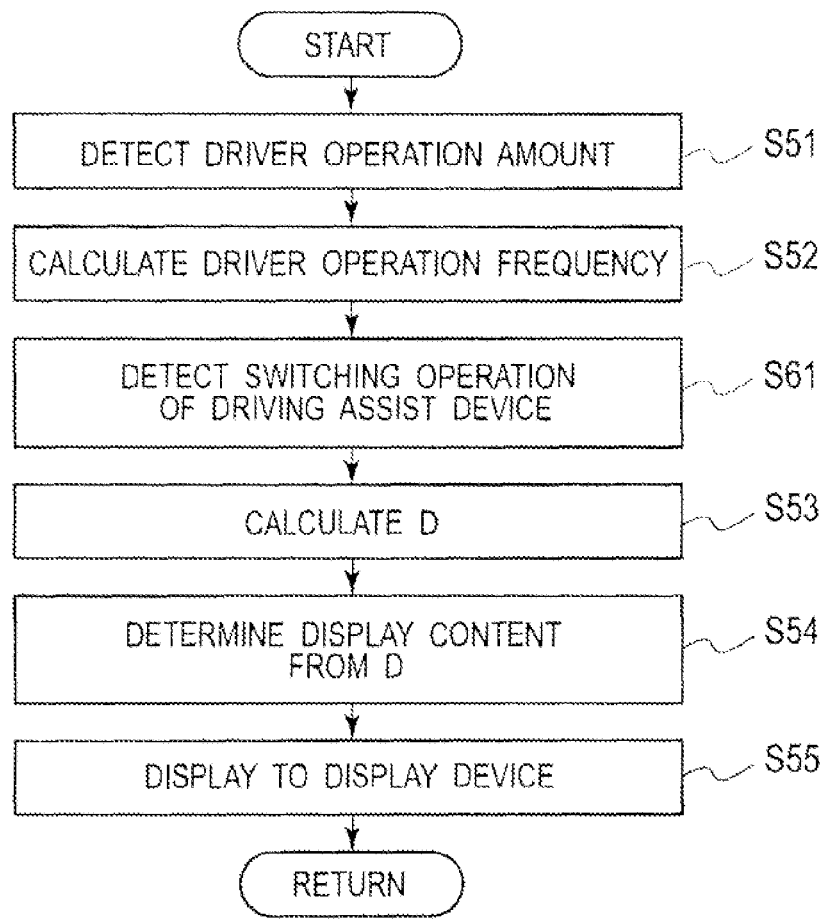
FIG. 31 is a flowchart showing representation control processing according to the sixth embodiment.

FIG. 31 is a flowchart showing a representation control processing according to the sixth embodiment.

Herein, other than addition of step S61 (for reading the switching operating state of the driving assistance system) before step S53, FIG. 31 implements processes same as those in FIG. 25, thus, explanations about the common processes are to be omitted.

At step S61, the process reads ON/OFF state of a driving assistance system switch. The driving assistance system switch can forcibly turn OFF the operations such as LDP. MB, VDC, HSA, HDC and the like.

At the subsequent step S53, the process calculates the driver's contribution amount D by the following expression when the driver explicitly turns OFF the driving assistance system switch.

$$D=\{a+(100-a)\cdot h\}$$

Herein, "a" is set as the driver's contribution amount D at the driver's ordinary state and is calculated from an average of the driver's contribution amount D. When the driver's contribution amount D of the driver's ordinary state is not set, a=0.

Figure 32:
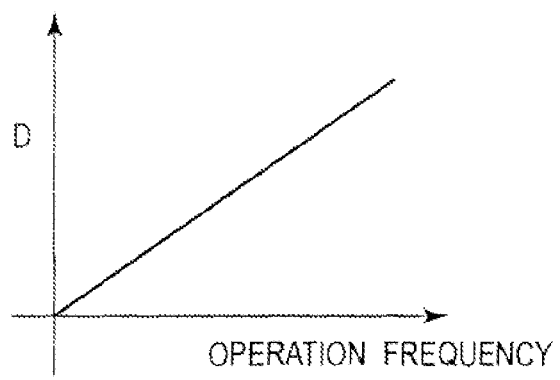
FIG. 32 is a graphical representation for the relationship between the frequency of vehicle driver operation and the driver's contribution amount.

FIG. 32 is a graph showing the relation between the operation frequency h and the driver's contribution amount D.

As shown in FIG. 32, the higher the operation frequency h is, the higher the driver's contribution amount D is.

At the subsequent step S54, the process determines the visual form which is in accordance with the driver's contribution amount D.

Figure 33:
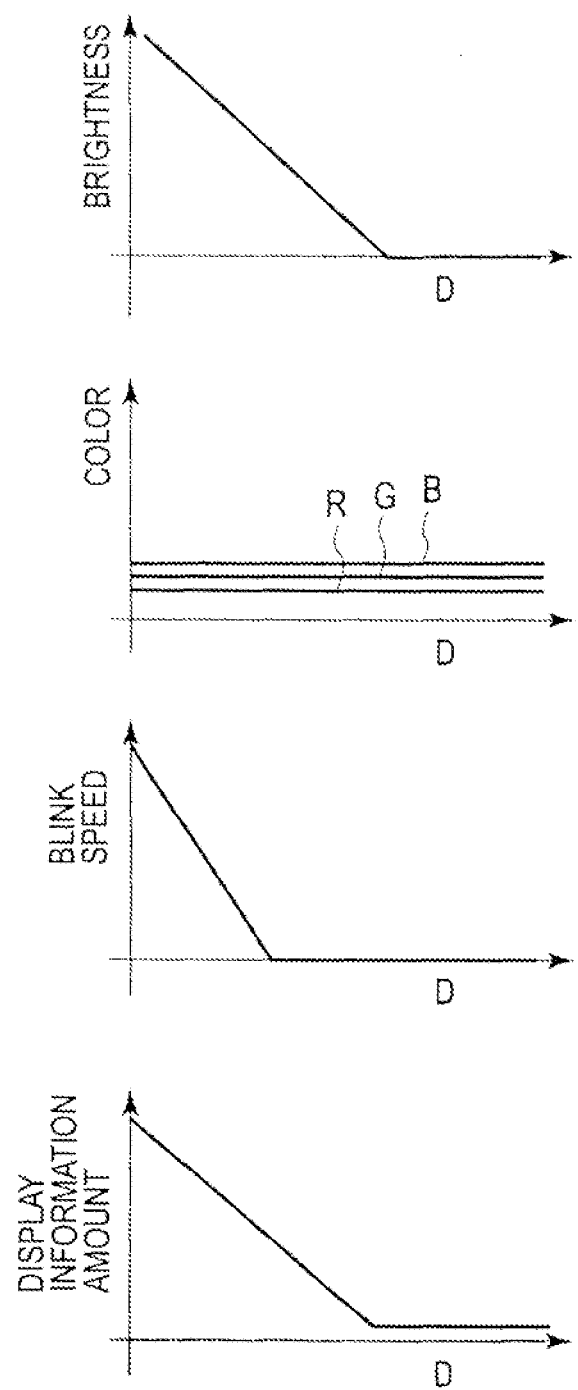
FIG. 33 shows various maps used for determining the visual form which is in accordance with the driver's contribution amount.

FIG. 33 shows various maps for determining the visual form which is in accordance with the driver's contribution amount D.

As shown in FIG. 32, the brightness, additive color mixing, blink speed, display information amount are to be determined in accordance with the driver's contribution amount D. For example, the higher the driver's contribution amount D is, the more suppressed the brightness, blink speed and display information amount are.

In addition, the display viewpoint may be adjusted in accordance with the driver's contribution amount D.

<<Operation>>

When the driver keeps the driving assistance system switch OFF, it is assumed that the driver has an intention to enjoy his/her own driving. Thus, in this case, the amount of the operation frequency h may be regarded as scale of the driver's contribution amount D. Then, the process reads the operating state of the driving assistance system switch (step S61), changes the calculation method of the driver's contribution amount D according to the operation frequency h to thereby calculate the driver's contribution amount D according to the graph in FIG. 32 (step S53), and changes the visual form according to the thus calculated driver's contribution amount D (step S54). For example, the higher the driver's contribution amount D is, the more suppressed the brightness, blink speed and display information amount are. That is, when the driver's contribution amount D is high, the process interprets that a positive (aggressive) display is not necessary, thus setting the entire display image rather dark, setting the color combination of display content rather dark, and setting the display information amount small.

In this way, in the scene where the driver intends to enjoy his/her own driving, only the minimum-necessary information can be displayed.

<<Effect>>

The process calculates the driver's contribution amount D according to the switching operation of the driving assistance system. With this, the driver's contribution amount D to the vehicle driving can be calculated in a wider scene and by simple calculations.

Seventh Embodiment

Structure

In the seventh embodiment, the process changes the display content in accordance with the driver's waking state (looming driving and the like).

Figure 34:
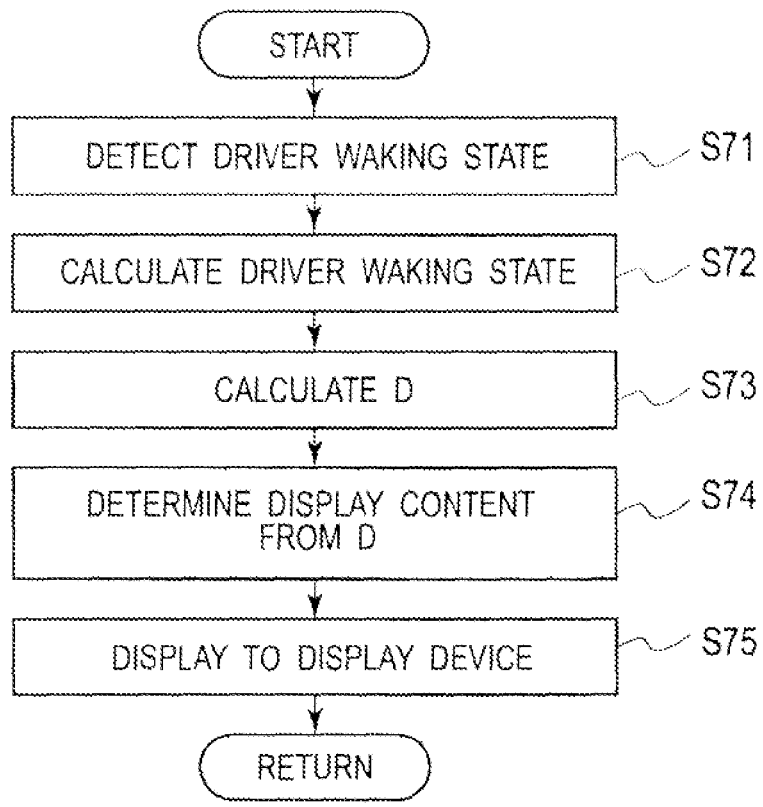
FIG. 34 is a flowchart showing representation control processing according to the seventh embodiment.

FIG. 34 is a flowchart showing a representation control processing according to the seventh embodiment.

At first, at step S71, the process detects at least one of the driver's driving operating state, the driver's biological reaction and the driver's behavior, examples thereof including: the driver's steering operation; the driver's cardiac rate, body temperature and myoelectric potential; information of camera for shooting the driver (eyelid movement, head movement, sight line change and the like) and the like.

At the subsequent step S72, the process calculates the driver waking state W from various pieces of information which were read. The driver waking state W is in a range of 0 to 1.0. When the driver is in a waking state, the driver waking state W is defined as 1.0.

Figure 35:
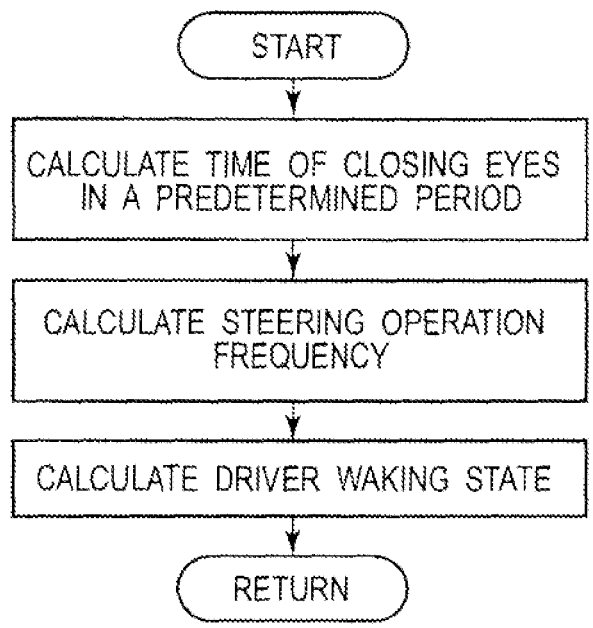
FIG. 35 illustrates an example of a flowchart showing waking state calculation processing.

FIG. 35 is an example of a flowchart showing a waking state calculation process.

As shown in FIG. 35, the process calculates the waking state W according to time when the driver is closing eyes in a predetermined period or according to the steering operation frequency.

At the subsequent step S73, following the expression below, the process calculates the driver's contribution amount D according to the waking state W.

$$D=1-(1-W)^2\times 100[\%]$$

Moreover, other than the above description, the following calculation is allowed: a map for calculating the driver's contribution amount D is provided in advance, then, with the driver waking state W as input, the driver's contribution amount D is calculated from the map.

Figure 36:
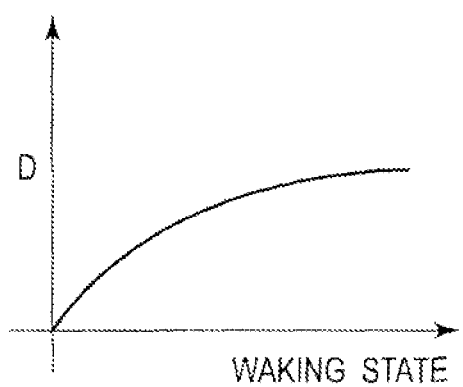
FIG. 36 shows a map used for calculating the driver's contribution amount.

FIG. 36 is a map used for calculating the driver's contribution amount D.

Referring to the above map, the process may calculate the driver's contribution amount D according to the waking state W.

At the subsequent step S74, the process determines the visual form which is in accordance with the driver's contribution amount D.

Figure 37:
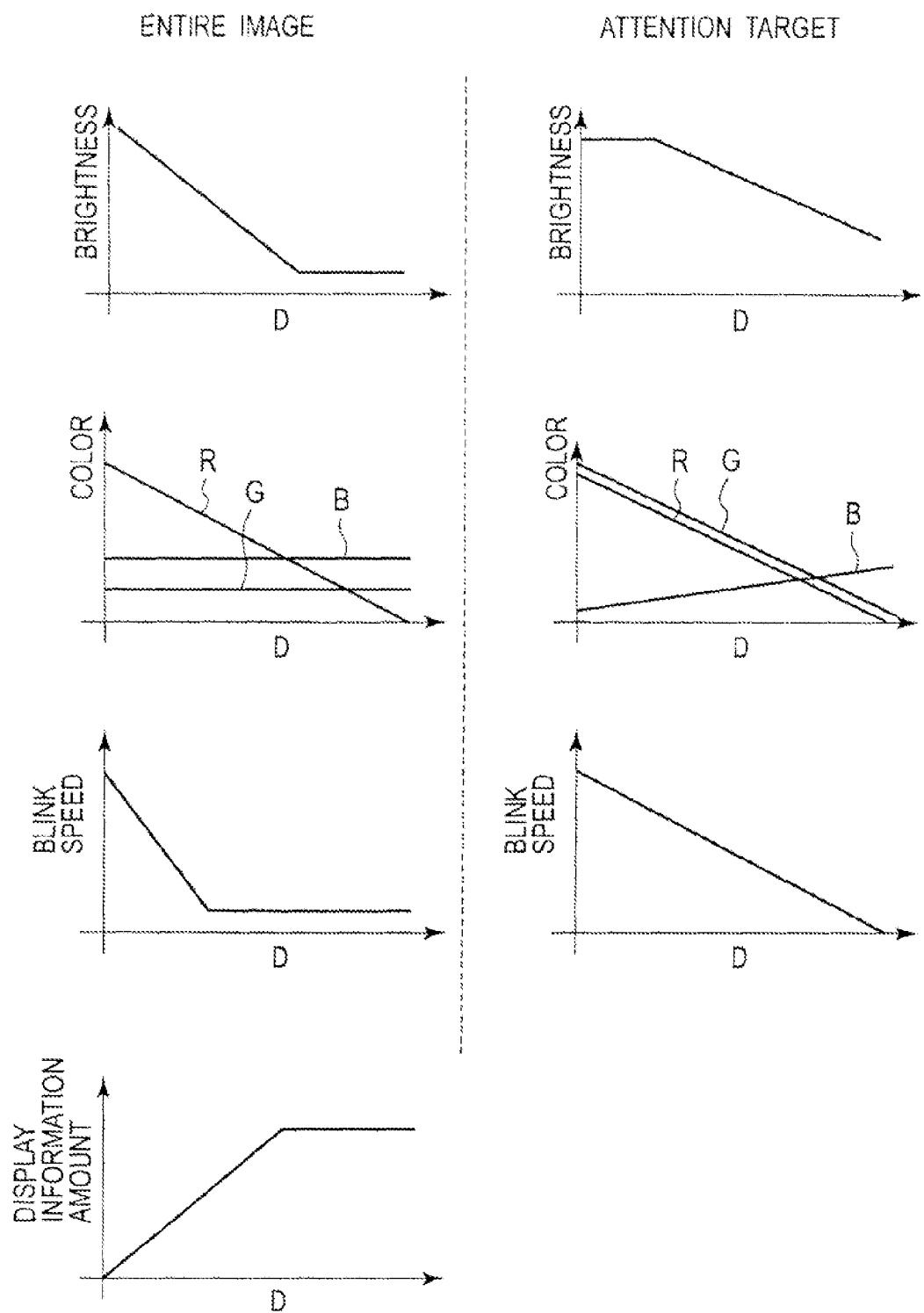
FIG. 37 shows various maps, each being used for determining a visual form which is in accordance with the driver's contribution amount.

FIG. 37 shows various maps for determining the visual form which is in accordance with the driver's contribution amount D.

Herein, by making a distinction between the entire image and the attention target, the process determines the brightness, additive color mixing, blink speed, display information amount in accordance with the driver's contribution amount D. For example, in terms of the entire image, the higher the driver's contribution amount D is, the more suppressed the brightness and blink speed are and the larger the display information amount is, meanwhile, regarding the additive color mixing, the lower the driver's contribution amount D is the denser (stronger) the red is. Moreover, in terms of the attention target, the higher the driver's contribution amount D is, the more suppressed the brightness and blink speed are, meanwhile, regarding the additive color mixing, the lower the driver's contribution amount D is, the denser (stronger) the red and green are and the lighter (weaker) the blue is.

At the subsequent step S75, the process supplies the information to the driver via the display device 7 according to the determined visual form and then returns to the predetermined main program.

In addition, the display viewpoint may be adjusted in accordance with the driver's contribution amount D.

<<Operation>>

It is assumed that the lower the driver waking state W is, the more looming driving the driver is making. Thus, the process calculates the driver's contribution amount D according to the waking state W (step S73), and then the process changes the visual form according to the thus calculated driver's contribution amount D (steps S74 and S75). For example, as the driver's contribution amount D gets lower, the brightness is increased, the hue is emphasized and the blink speed is increased while the display information amount is suppressed. That is, when the driver's contribution amount D is low, the entire display image is set bright and the color combination is made strong.

In this way, in the scene where the driver is making a looming driving, the display content such as the system operating state can be emphasized.

<<Effect>>

(1) The calculating unit calculates a waking state W of the driver and calculates the driver's contribution amount D depending on the calculated waking state W.

With this, the driver's contribution amount D to the vehicle driving can be calculated in a wider scene and by simple calculations.

Eighth Embodiment

Structure

In the eighth embodiment, the process changes the display content according to a driving route and a driving frequency (passage frequency) i.

Figure 38:
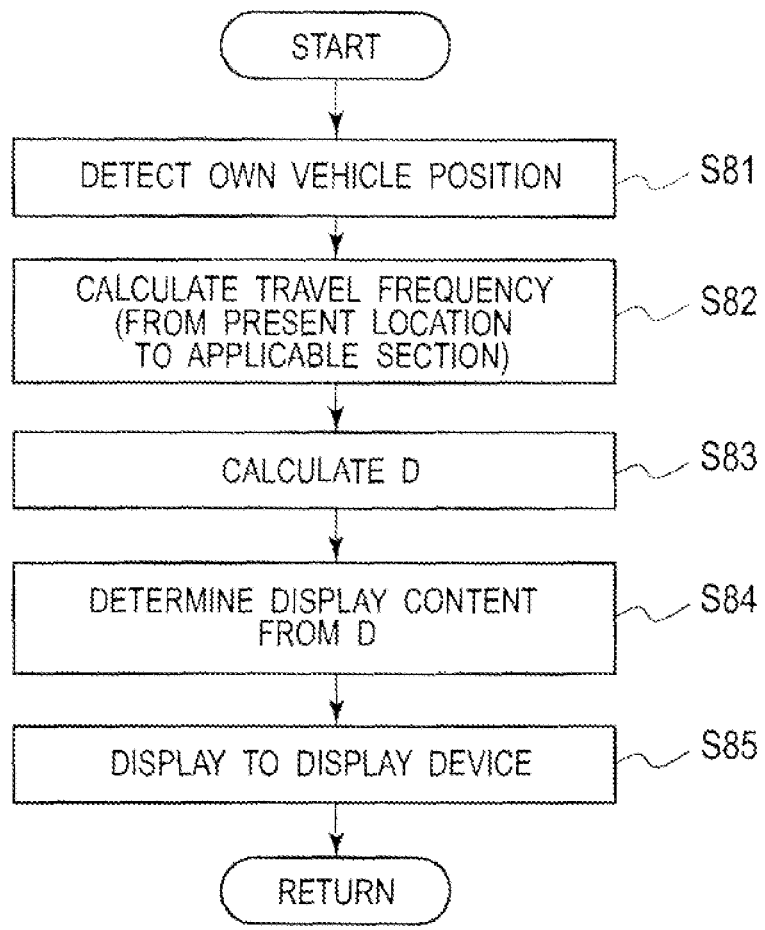
FIG. 38 is a flowchart showing representation control processing according to the eighth embodiment.

FIG. 38 is a flowchart showing a representation control processing according to the eighth embodiment.

At first, at step S81, the process reads, from the navigation system 9, the present location of the own vehicle.

At the subsequent step S82, the process calculates the driving frequency i at which the own vehicle drives from the present location to an applicable section.

At the subsequent step S83, the process calculates the driver's contribution amount D according to the driving frequency i in the present location.

Herein, when the driving frequency i is smaller than or equal to an "unfamiliar" threshold th1 (for example, th1=3) which was calculated in advance, the process calculates the driver's contribution amount D according to the following expression.

$$D=100-a\cdot(th1-i)$$

On the other hand, when the driving frequency i is smaller than a "familiar" threshold th2 (for example, th2=10) which was calculated in advance, the process calculates the driver's contribution amount D according to the following expression.

$$D=100-a\cdot(th2-i)$$

Moreover, when the driving frequency i is larger than or equal to the "familiar" threshold th2, the process sets the driver's contribution amount D to 100 as shown in the following expression.

$$D=100$$

Figure 39:
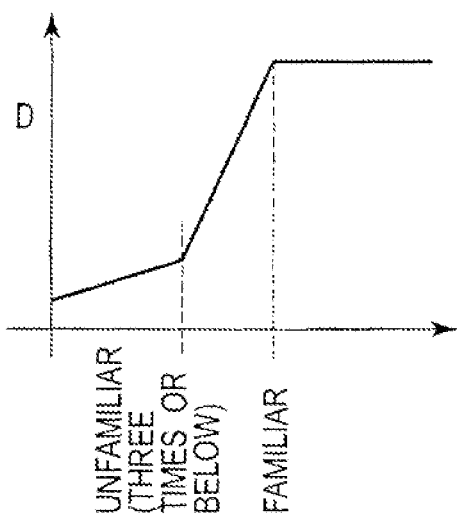
FIG. 39 is a graphical representation for the relationship between the familiarization and the driver's contribution amount.

FIG. 39 is a graph showing the relation between the familiarity degree and the driver's contribution amount D.

As shown in FIG. 39, more familiar route makes the driver's contribution amount D larger.

At the subsequent step S84, the process determines the visual form which is in accordance with the driver's contribution amount D.

Figure 40:
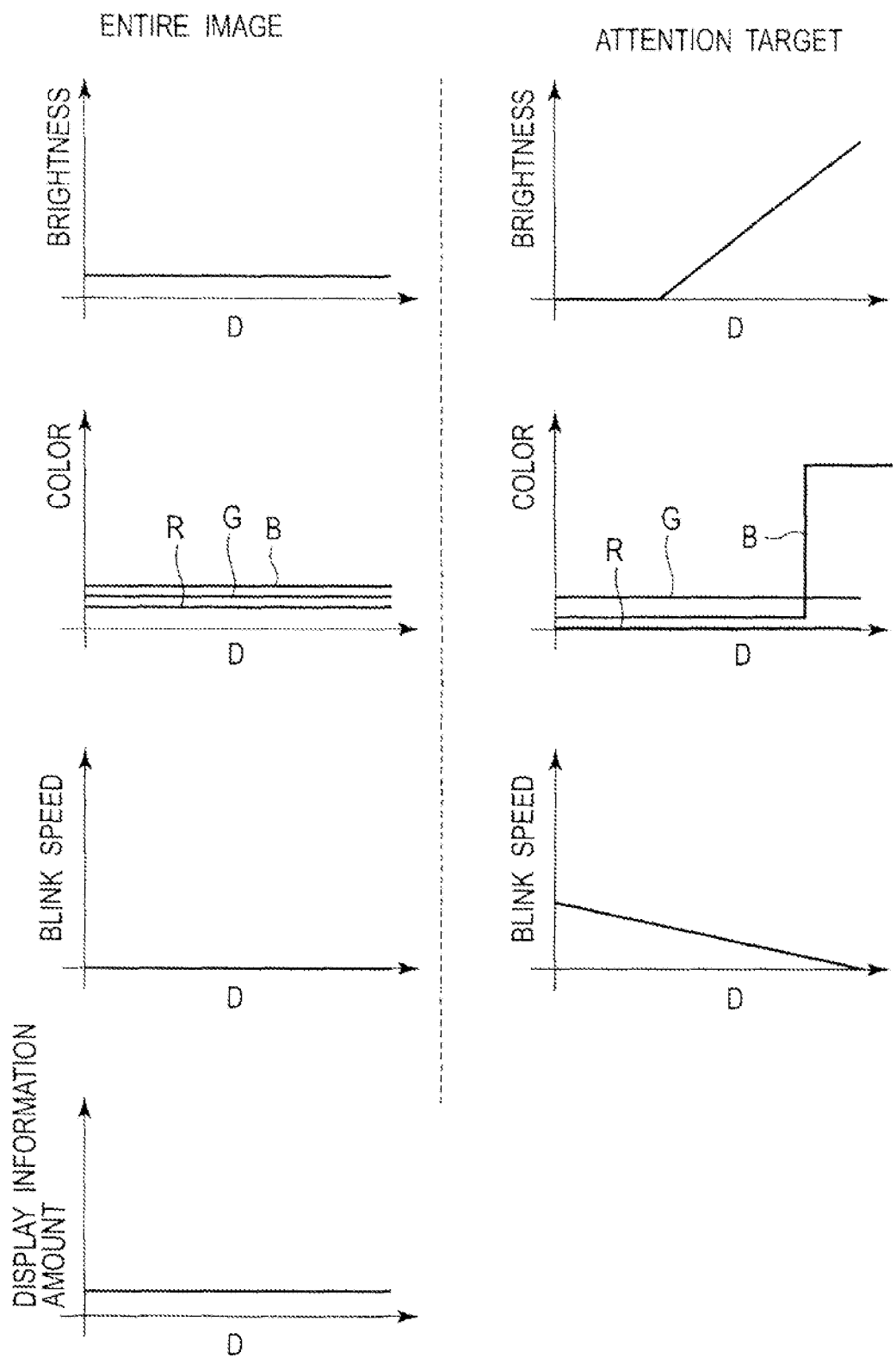
FIG. 40 shows various maps, each being used for determining a visual form which is in accordance with the driver's contribution amount.

FIG. 40 shows various maps for determining the visual form which is in accordance with the driver's contribution amount D.

Herein, by making a distinction between the entire image and the attention target, the process determines the brightness, additive color mixing, blink speed, display information amount in accordance with the driver's contribution amount D. For example, in terms of the entire image, the process makes constant the brightness, hue, blink speed and display information amount regardless of the driver's contribution amount D. Moreover, in terms of the attention target, as the driver's contribution amount D is higher, the brightness is increased, the blue is made denser (stronger) and the blink speed is lowered.

At the subsequent step S85, the process supplies the information to the driver via the display device 7 according to the determined visual form and then returns to the predetermined main program.

In addition, the display viewpoint may be adjusted in accordance with the driver's contribution amount D.

<<Operation>>

It is assumed that the less familiar the route is, the lower the driver's contribution amount D is. Thus, the process calculates the driver's contribution amount D according to the driving frequency i (step S83) and changes the visual form according to the thus calculated driver's contribution amount D (steps S84 and S85). For example, as the driver's contribution amount D gets higher, the brightness is increased and the hue is emphasized. Contrary to this, when the vehicle is driving on an unfamiliar route, the driver's contribution amount D is lower, in this case, not only the operating state of the system but also the surrounding risk information is to be displayed positively. That is, irrespective of the driver's contribution amount D, the process sets the entire display image rather dark and sets the color combination rather dark. Moreover, when the driver's contribution amount D is low, the process positively displays the risk information as the attention target.

<<Effect>>

(1) The calculating unit calculates how many times i in the past the vehicle driver drove on its route, and calculates the driver's contribution amount D depending on the calculated number of times i.

With this, the driver's contribution amount D to the vehicle driving can be calculated in a wider scene and by simple calculations.

Ninth Embodiment

Structure

In the ninth embodiment, the process changes the display content according to a congestion state of the road.

Figure 41:
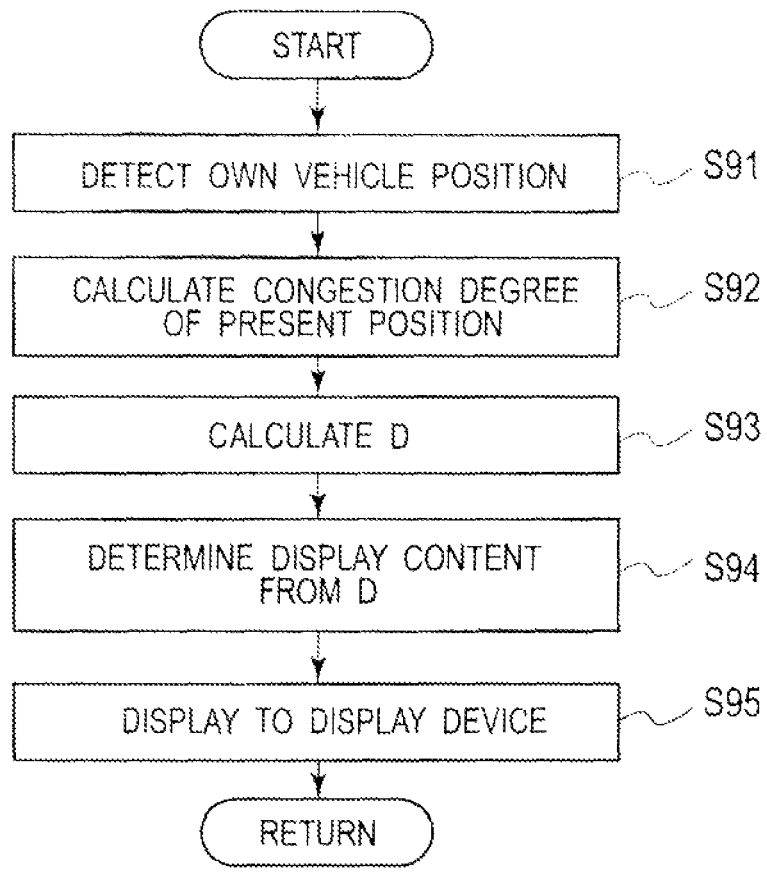
FIG. 41 is a flowchart showing representation control processing according to the ninth embodiment.

FIG. 41 is a flowchart showing a representation control processing according to the ninth embodiment.

At first, at step S91, from the navigation system 9, the process reads the present location of the own vehicle.

At the subsequent step S92, referring to the present location, the process reads the congestion degree (traffic jam) G which is determined per each section of the road.

At the subsequent step S93, the process calculates the driver's contribution amount D according to the congestion degree G.

Herein, when the congestion degree G is lower than a first threshold (for example, less than or equal to 1.0), the vehicle can drive without a substantial traffic jam, thus, as shown in the following expression, the process sets the driver's contribution amount to 100%.

$$D=100$$

On the other hand, when the congestion degree G is higher than the first threshold and lower than a second threshold (for example, less than 1.75), the road has a substantial traffic jam, thus, the process calculates the driver's contribution amount D according to the following expression.

$$D=\{(1.75-G)\times 100\}[\%]$$

Moreover, when the congestion degree G is higher than the second threshold, the process sets the driver's contribution amount D to 0 as shown below.

$$D=0$$

Figure 42:
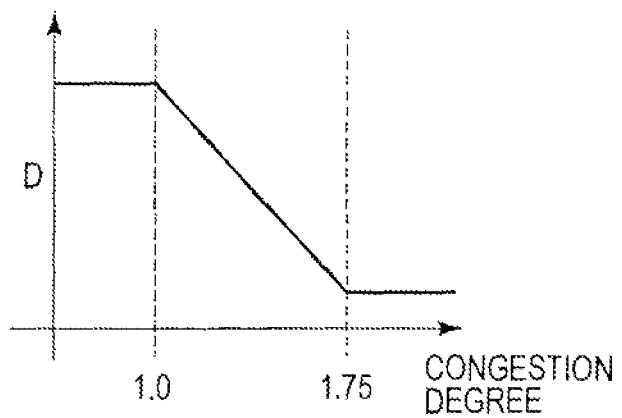
FIG. 42 illustrates a graphical representation for the relationship between the traffic congestion and the driver's contribution amount.

FIG. 42 is a graph showing the relation between the congestion degree G and the driver's contribution amount D.

As shown in FIG. 42, the higher the congestion degree G is, the lower the driver's contribution amount D is.

At the subsequent step S94, the process determines the visual form which is in accordance with the driver's contribution amount D.

Figure 43:
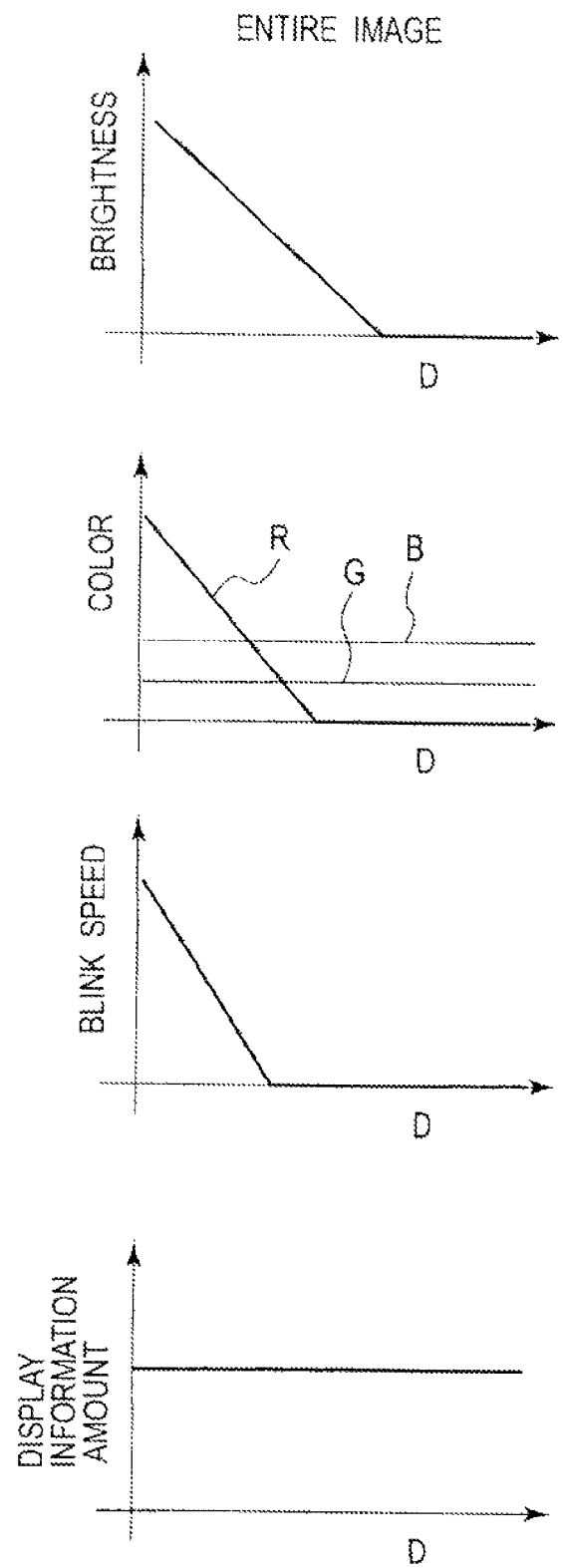
FIG. 43 shows various maps, each being used for determining a visual form which is in accordance with the driver's contribution amount.

FIG. 43 shows various maps for determining the visual form which is in accordance with the driver's contribution amount D.

As shown in FIG. 43, the brightness, additive color mixing, blink speed, display information amount are to be determined in accordance with the driver's contribution amount D. For example, the higher the driver's contribution amount D is, the more suppressed the brightness and blink speed are, while in terms of the additive color mixing, the lower the driver's contribution amount D is, the denser (stronger) the red is.

At the subsequent step S95, the process supplies the information to the driver via the display device 7 according to the determined visual form and then returns to the predetermined main program.

In addition, the display viewpoint may be adjusted in accordance with the driver's contribution amount D.

<<Operation>>

It is desirable that as the congestion degree G of the road is higher, not only the operating state of the system but also the risk information is positively displayed. Then, the higher the congestion degree G is, the lower the driver's contribution amount D is made (step S93), thereafter altering the visual form according to the thus lowered driver's contribution amount D (steps S94 and S95). For example, as the driver's contribution amount D gets lower, the brightness is increased, the blink speed is increased and the hue is emphasized. That is, irrespective of the driver's contribution amount D, the process sets a large amount of display information, while when the driver's contribution amount D is low, the process sets the entire display image bright and sets the color combination bright.

In this way, when the vehicle is driving on the congested road, the process can emphasize the risk information, not only displaying the operating state of the system.

<<Effect>>

(1) The calculating unit detects traffic congestion G, and calculates the driver's contribution amount D depending on the detected traffic congestion G.

With this, the driver's contribution amount D to the vehicle driving can be calculated in a wider scene and by simple calculations.

Tenth Embodiment

Structure

In the tenth embodiment, the process calculates the driver's contribution amount D from the traffic jam state of the entire route.

Figure 44:
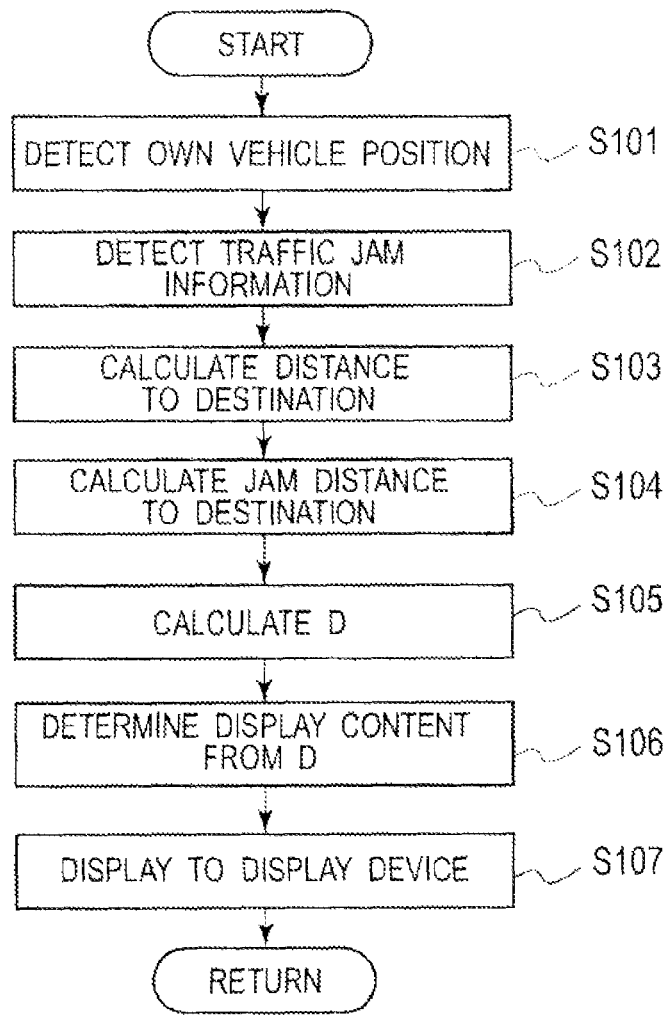
FIG. 44 is a flowchart of representation control processing according to the tenth embodiment.

FIG. 44 is a flowchart showing a representation control processing according to the tenth embodiment.

At first, at step S101, from the navigation system 9, the process reads the present location of the own vehicle.

At the subsequent step S102, from the VICS information of the navigation system 9, the process reads the traffic jam information.

At the subsequent step S103, from the navigation system 9, the process reads a distance L to the destination.

At the subsequent step S104, from the VICS information of the navigation system 9, the process reads a jam distance Lc to the destination.

At the subsequent step S105, following the expression below, the process calculates the driver's contribution amount D according to the jam distance Lc included in the distance L to the destination.

$$D = \{(L-Lc)/L\} \times 100 [\%]$$

Figure 45:
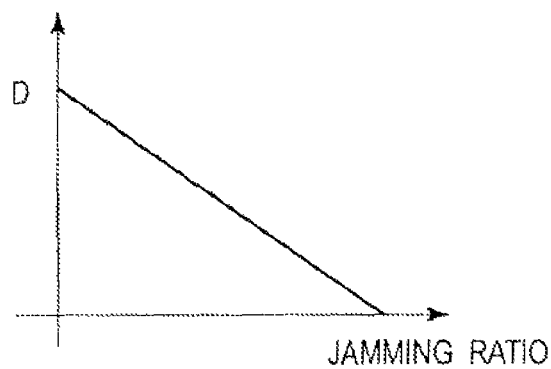
FIG. 45 is a graphical representation for the relationship between the traffic congestion and the driver's contribution amount.

FIG. 45 is a graph showing the relation between the jamming ratio and the driver's contribution amount D.

As shown in FIG. 45, the higher the jamming ratio is, the lower the driver's contribution amount D is.

At the subsequent step S106, the process determines the visual form which is in accordance with the driver's contribution amount D.

FIG. 46 shows various maps for determining the visual form which is in accordance with the driver's contribution amount D.

As shown in FIG. 46, the brightness, additive color mixing, blink speed and display information amount are to be determined in accordance with the driver's contribution amount D. For example, the higher the driver's contribution amount D is, the more suppressed the brightness and blink speed are while increasing the display information amount. Concerning the additive color mixing, as the driver's contribution amount D is lower, the red is denser (stronger).

At the subsequent step S107, the process supplies the information to the driver via the display device 7 according to the determined visual form and then returns to the predetermined main program.

In addition, the display viewpoint may be adjusted in accordance with the driver's contribution amount D.

<<Operation>>

It is desirable that as the jamming ratio is higher, not only the operating state of the system but also the risk information is positively displayed until the own vehicle reaches the destination. Then, the higher the jamming ratio is, the lower the driver's contribution amount D is made (step S105), thereafter altering the visual form according to the thus lowered driver's contribution amount D (steps S106 and S107). For example, as the driver's contribution amount D gets lower, the brightness is increased, the blink speed is increased and the hue is emphasized. That is, when the driver's contribution amount D is high, the process sets a large amount of display information, while when the driver's contribution amount D is low, the process sets the entire display image rather bright and sets the color combination rather bright.

In this way, in a scene having a high jamming ratio, the process can emphasize the risk information, not only displaying the operating state of the system.

<<Effect>>

The process calculates the driver's contribution amount D according to the jam distance Lc included in the distance L to the destination.

With this, the driver's contribution amount D to the vehicle driving can be calculated in a wider scene and by simple calculations.

Eleventh Embodiment

Structure

In the eleventh embodiment, the process calculates the driver's contribution amount D from a speed limit Vr.

Figure 47:
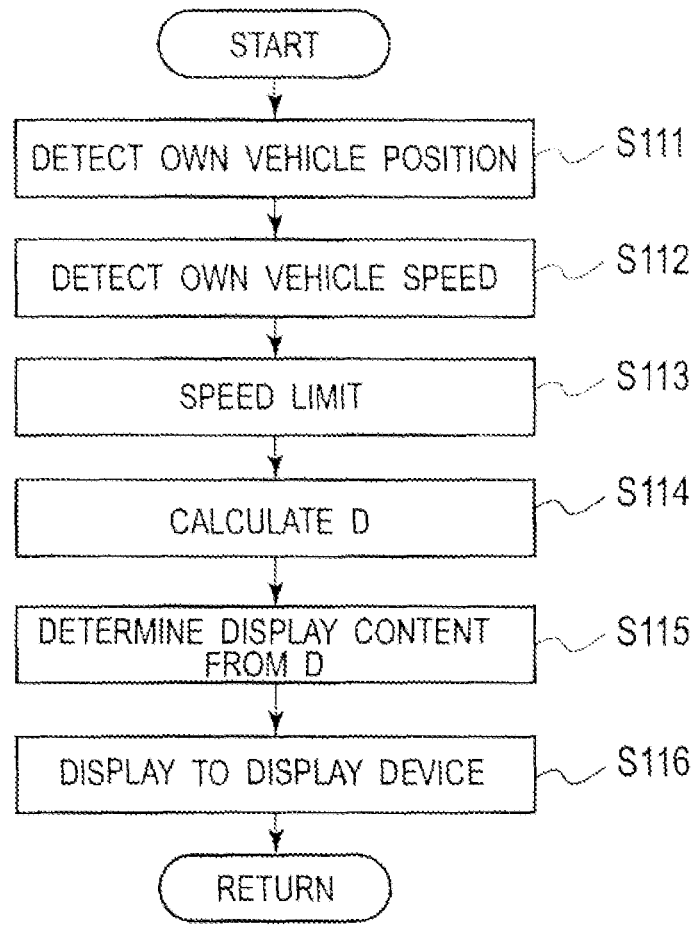
FIG. 47 is a flowchart showing representation control processing according to the eleventh embodiment.

FIG. 47 is a flowchart showing a representation control processing according to the eleventh embodiment.

At first, at step S111, from the navigation system 9, the process reads the present location of the own vehicle.

At the subsequent step S112, the process reads an actual speed Vv of the own vehicle.

At the subsequent step S113, from the navigation system 9, the process reads the speed limit Vr of the road where the own vehicle is presently driving. The speed limit Vr is set per road. For example, in the case of an ordinary road, the speed limit Vr is set to 60 km/h, while in the case of high way, the speed limit Vr is set to 100 km/h. In addition, if such speed limit Vr is obtainable through infrastructure, the process reads the thus obtained speed limit Vr data.

At the subsequent step S114, following the expression below, the process calculates the driver's contribution amount D according to the difference between the own vehicle speed Vv and the speed limit Vr.

[Formula 4]

$$D = \left\{1.0 - \left(\frac{a\sqrt{(Vv-Vr)^2}}{Vr}\right)\right\} \times 100 [\%]$$

Herein, the coefficient a=1. However, the coefficient "a" may be changed according to the own vehicle speed Vv relative to the speed limit Vr (higher or lower). For example, when the own vehicle speed Vv is higher than the speed limit Vr, the process sets a<1 (for example, 0.5), while when the own vehicle speed Vv is lower than the speed limit Vr, the process sets a>1 (for example. 1.1).

Figure 48:
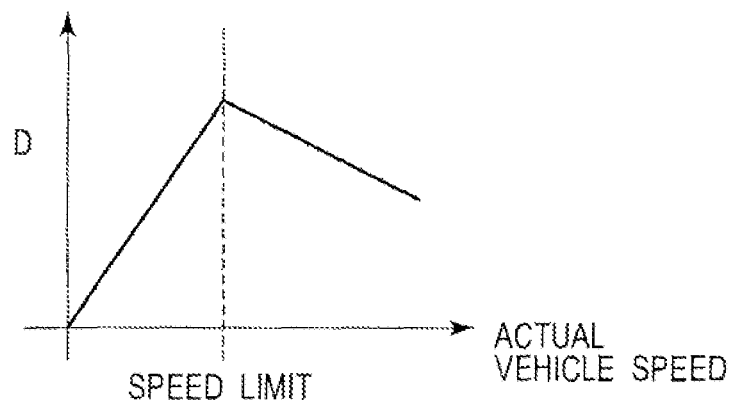
FIG. 48 is a graphical representation for the relationship between the vehicle speed of an own vehicle and the driver's contribution amount.

FIG. 48 is a graph showing the relation between the own vehicle speed Vv and the driver's contribution amount D.

As shown in FIG. 48, the closer the own vehicle speed Vv is to the speed limit Vr, the larger the driver's contribution amount D is.

At the subsequent step S115, the process determines the visual form which is in accordance with the driver's contribution amount D.

FIG. 49 shows various maps for determining the visual form which is in accordance with the driver's contribution amount D.

As shown in FIG. 49, the brightness, additive color mixing, blink speed, display information amount are to be determined in accordance with the driver's contribution amount D. For example, the higher the driver's contribution amount D is, the more suppressed the brightness and blink speed are. Regarding the additive color mixing, the lower the driver's contribution amount D is, the denser (stronger) the red is.

At the subsequent step S116, according to the determined visual form, the process supplies the information to the driver via the display device 7 and then returns to the predetermined main program.

In addition, the display viewpoint may be adjusted in accordance with the driver's contribution amount D.

<<Operation>>

It is assumed that when the driver maintains the legal speed, the driver's contribution amount D is high. Thus, the process calculates the driver's contribution amount D according to the difference between the own vehicle speed Vv and the speed limit Vr of the road where the own vehicle is presently driving (step S114), and then changes the visual form according to the thus calculated driver's contribution amount D (steps S115 and S116). For example, as the driver's contribution amount D gets lower, the brightness is increased, the blink speed is made higher and the hue is emphasized. That is, when the driver's contribution amount D is high, the process sets the entire display image rather dark and sets the color combination rather dark.

In this way, in a scene where the driver's contribution amount D is low, the process can emphasize the risk information, not only displaying the operating state of the system.
<<Effect>>

(1) The calculating unit calculates the driver's contribution amount D depending on a speed limit Vr for a road on which the driver is driving.

With this, the driver's contribution amount D to the vehicle driving can be calculated in a wider scene and by simple calculations.

Twelfth Embodiment

Structure

In the twelfth embodiment, the process changes the display content when the own vehicle is surrounded by other vehicles.

Figure 50:
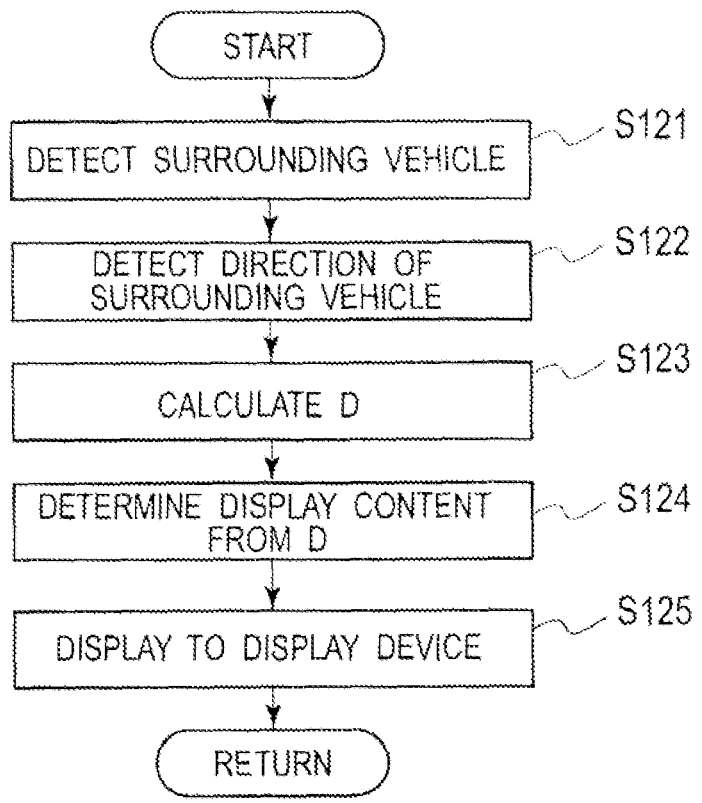
FIG. 50 is a flowchart showing representation control processing according to the twelfth embodiment.

FIG. 50 is a flowchart showing a representation control processing according to the twelfth embodiment.

At first, at step S121, the process detects surrounding vehicle(s) detected by the laser radar 1.

At the subsequent step S122, the process calculates the position of the surrounding vehicle(s), that is, frontward or rearward relative to the own vehicle or rightward or leftward relative to the own vehicle. For example, from the position of the surrounding vehicle which is present within a predetermined range of the own vehicle, the process makes a grouping into "frontward P_front," "rearward P_rear," "rightward P_right" and "leftward P_left." When the other vehicle is present in any of the above directions, the process sets 1, while not present, the process sets 0.

At the subsequent step S123, following the expression below, the process calculates the driver's contribution amount D according to whether or not the surrounding vehicle is present in any of the directions.

$$D=100-25\times(P\_front+P\_rear+P\_right+P\_left)$$

Figure 51:
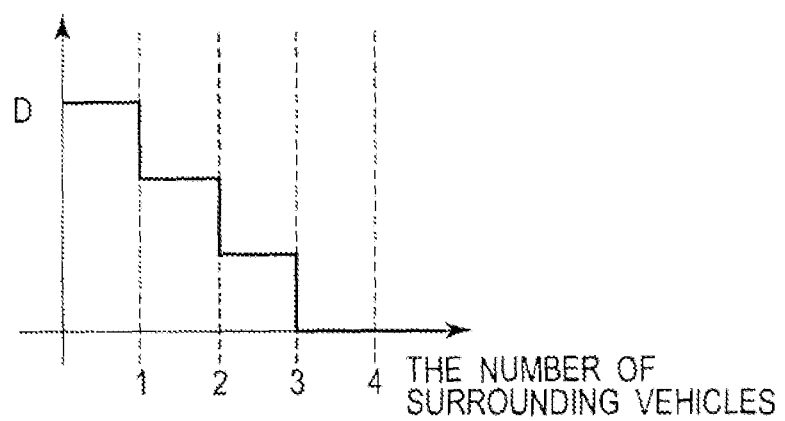
FIG. 51 is a graphical representation for the relationship between the number of vehicles in the surroundings of an own vehicle and the driver's contribution amount.

FIG. 51 is a graph showing the relation between the number of surrounding vehicles and the driver's contribution amount D.

When the other vehicle is present around the own vehicle, movement of the own vehicle is to be restricted. Thus, as shown in FIG. 51, the larger the number of surrounding vehicles is, the smaller the driver's contribution amount D is.

At the subsequent step S124, the process determines the visual form which is in accordance with the driver's contribution amount D.

Figure 52:
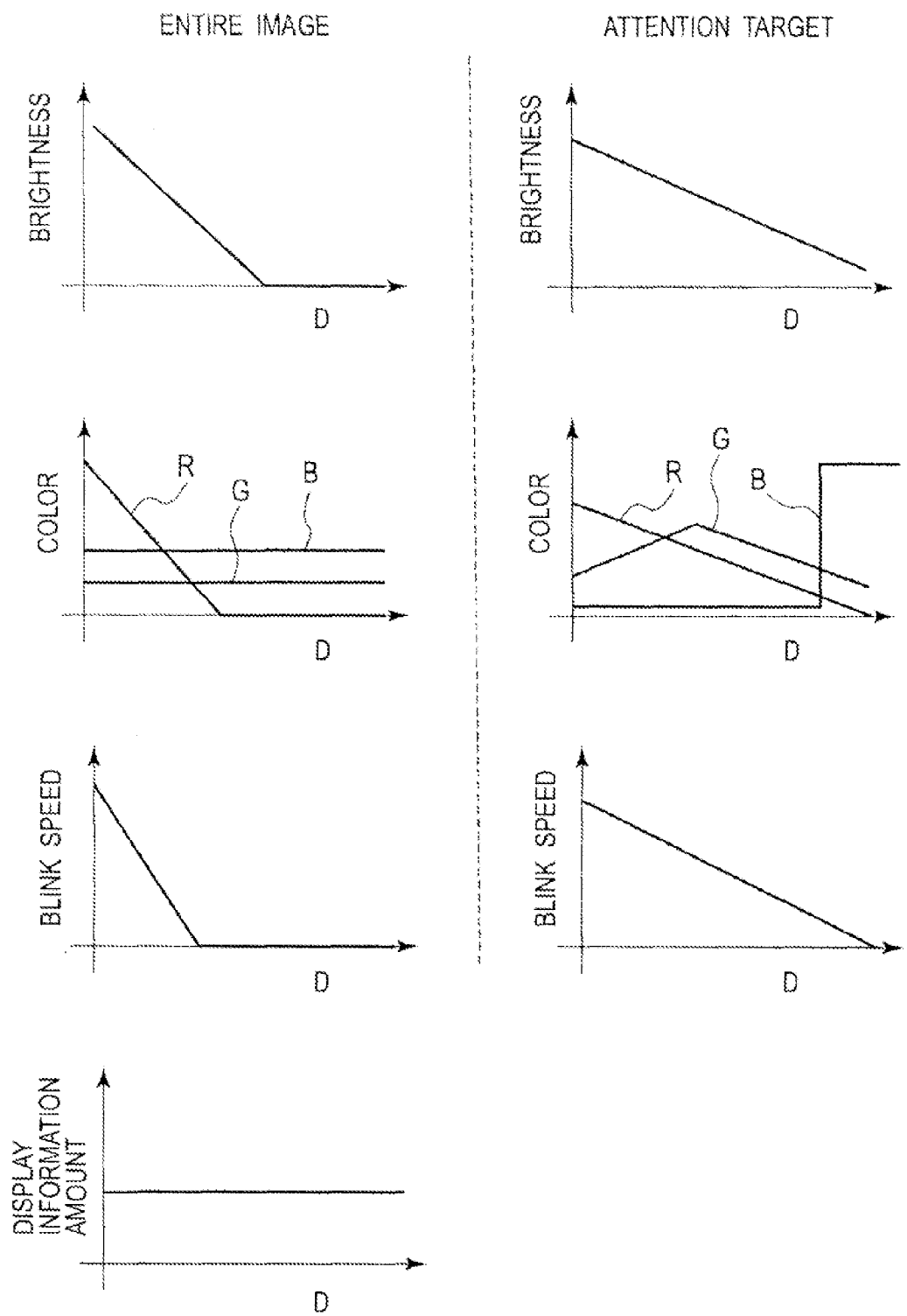
FIG. 52 shows various maps, each being used for determining a visual form which is in accordance with the driver's contribution amount.

FIG. 52 shows various maps for determining the visual form which is in accordance with the driver's contribution amount D.

Herein, by making a distinction between the entire image and the attention target, the process determines the brightness, additive color mixing, blink speed and display information amount in accordance with the driver's contribution amount D. For example, in terms of the entire image, the higher the driver's contribution amount D is the more suppressed the brightness and blink speed are, meanwhile, regarding the additive color mixing, the lower the driver's contribution amount D is the denser (stronger) the red is. Moreover, in terms of the attention target, the higher the driver's contribution amount D is the more suppressed the brightness and blink speed are, meanwhile, regarding the additive color mixing, the higher the driver's contribution amount D is the stronger the blue is, the lower the driver's contribution amount D is the stronger the red is, and the higher the driver's contribution amount D is the stronger the green is at first and then the green is weaker after reaching the maximum.

At the subsequent step S125, the process supplies the information to the driver via the display device 7 according to the determined visual form and then returns to the predetermined main program.

In addition, the display viewpoint may be adjusted in accordance with the driver's contribution amount D.
<<Operation>>

It is desirable that, when there are many surrounding vehicles, the process positively (aggressively) displays the risk information. Then, the larger the surrounding vehicles are in number, the lower the driver's contribution amount D is (step S123). The process changes the visual form in accordance with the driver's contribution amount D (steps S124 and S125). For example, as the driver's contribution amount D is lower, the brightness is increased, the blink speed is increased and the hue is emphasized. That is, when the driver's contribution amount D is high, the process sets the entire display image rather dark, sets the color combination rather dark and sets the display information amount small. When the driver's contribution amount D is low, the process sets a large amount of display information and positively displays the risk information as the attention target, and sets the risk information and color combination bright.

In this way, in a scene where there are many surrounding vehicles, the process can emphasize the risk information, not only displaying the operating state of the system.
<<Effect>>

(1) The calculating unit detects the number of vehicles in the surroundings of the vehicle, and calculates the driver's contribution amount D depending on the detected number.

With this, the driver's contribution amount D to the vehicle driving can be calculated in a wider scene and by simple calculations.

Thirteenth Embodiment

Structure

In the thirteenth embodiment, the process predicts the driver's intention from the driver's switching operation and then corrects the calculated driver's contribution amount D.

Figure 53:
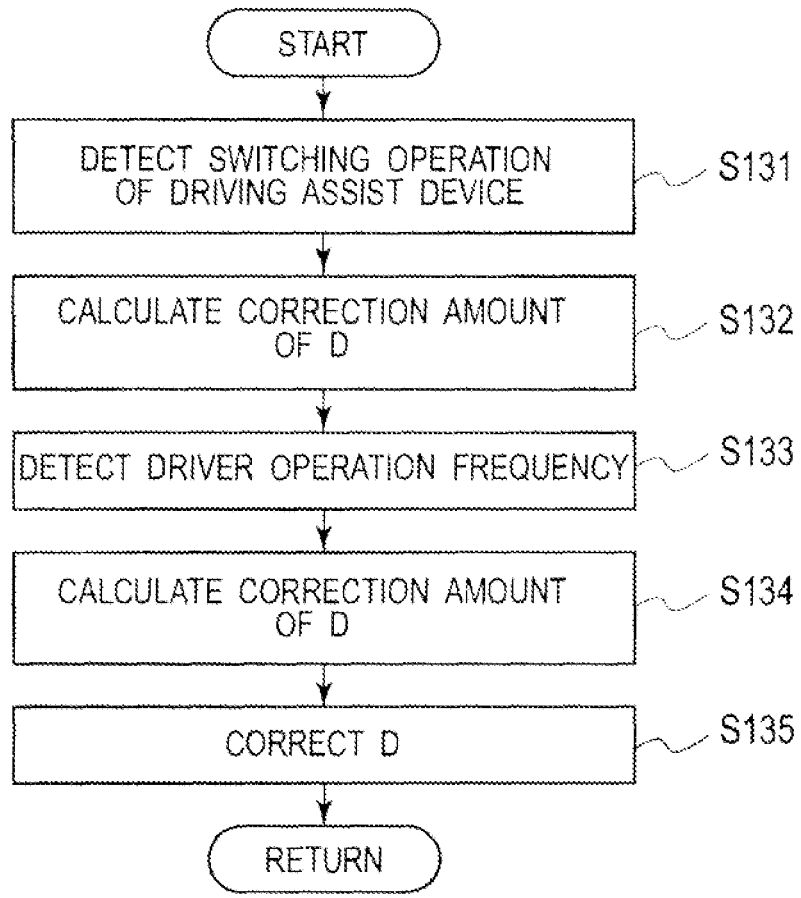
FIG. 53 is a flowchart showing processing for correcting the driver's contribution amount according to the thirteenth embodiment.

FIG. 53 is a flowchart showing a driver's contribution amount correction process according to the thirteenth embodiment.

At first, at step S131, the process reads ON/OFF state of the driving assistance system switch. The driving assistance system switch can forcibly turn OFF the operations such as LDP, MB, VDC, HSA, HDC and the like.

At the subsequent step S132, the process calculates a correction amount C of the driver's contribution amount D.

Herein, when the driver intentionally turns ON the driving assistance system, the process sets, for example. C=−25% for correcting the driver's contribution amount D lower, meanwhile, when the driver intentionally turns OFF the driving assistance system, the process sets, for example, C=25% for correcting the driver's contribution amount D higher. In addition, there is such a switch as to forcibly turn OFF the driving assistance system in the case that the driving assistance system is ordinarily turned ON (ON state), examples of the ON state control operation including the VDC. In this case, the correction amount C may be calculated only when such switch is turned OFF.

The process sets a correction value of the driver's contribution amount D in a range of −25% to 25%.

Figure 54:
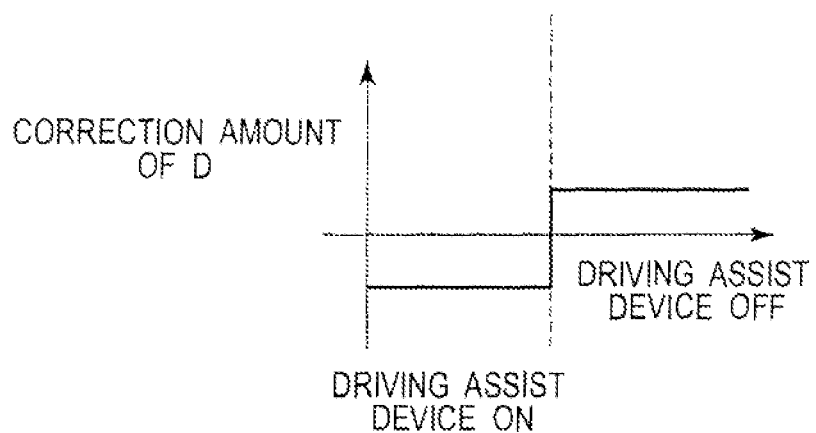
FIG. 54 is a graphical representation for the amount of correction depending on ON/OFF of a driver assistance system switch.

FIG. 54 is a graph showing the correction amount C according to ON/OFF of the driving assistance system switch.

As shown in FIG. 54, when the driving assistance system switch is turned ON, the process sets the correction amount C to a predetermined value on the minus side, while when the driving assistance system switch is turned OFF, the process sets the correction amount C to a predetermined value on the plus side.

At the subsequent step S133, like the fifth embodiment stated above, the process calculates the operation frequency h of various operating states of the driver, such as accelerator operation, braking operation, shift operation, steering operation, navigation operation and meters operation.

At the subsequent step S134, the process calculates the correction amount C according to the relation between the operation frequency h and the adequate frequency H. That is, when the difference between the operation frequency h and the adequate frequency H is within a predetermined range (for example, within ±10%), the process sets the correction amount C to 0. Moreover, as the difference (the operation frequency h being larger than the adequate frequency H) is larger, the correction amount C is enlarged to the plus side. On the contrary, as the difference (the operation frequency h being smaller than the adequate frequency H) is larger, the correction amount C is enlarged to the minus side.

Figure 55:
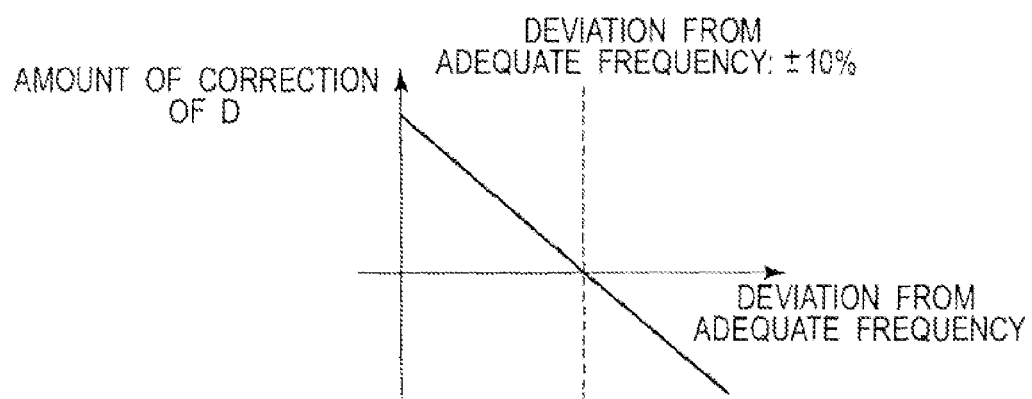
FIG. 55 is a graphical representation for the relationship between the deviation of the frequency of vehicle driver operation from the adequate frequency and the amount of correction.

FIG. 55 is a graph showing the relation between the difference (operation frequency h relative to adequate frequency H) and the correction amount C.

In FIG. 55, as the operation frequency h is larger relative to the adequate frequency H, the correction amount C is enlarged to the plus side, on the contrary, as the operation frequency h is smaller relative to the adequate frequency H, the correction amount C is enlarged to the minus side.

At the subsequent step S135, the process adds each correction amount C to the driver's contribution amount D (which is already calculated) to thereby correct the driver's contribution amount D and then returns to the predetermined main program.

In addition, when the corrected result is less than 0%, 0% is set as the lower limit, while when the corrected result is more than 100%, 100% is set as the upper limit, thus implementing the limiter process.

<<Operation>>

The ON/OFF state of the driving assistance system switch and the frequency h of various operations correlate with the driver's contribution amount D. Then, the process calculates the correction amount C according to the switching operation of the driving assistance system and the operation frequency h of other various operations (steps S132 and S134). Then, the process adds the correction amount C to the driver's contribution amount D (which is already calculated), to thereby correct the driver's contribution amount D (step S135).

That is, in the case of the driver having the operation frequency h close to the adequate frequency H, such driver is regarded as a skillful driver, thereby the driver's contribution amount D is corrected higher. Moreover, when the driver turns off the driving assistance system and thereby causing the operation frequency h away from the adequate frequency H, such driver is regarded as an unskillful driver, thereby the driver's contribution amount D is corrected lower.

<<Effect>>

The process corrects the driver's contribution amount D according to the switching operation of the driving assistance system.

With this, the process can calculate the driver's contribution amount D reflecting the driver's intention.

Fourteenth Embodiment

Structure

In the fourteenth embodiment, the process corrects the driver's contribution amount D according to the number of control interventions of the driving assistance system.

Figure 56:
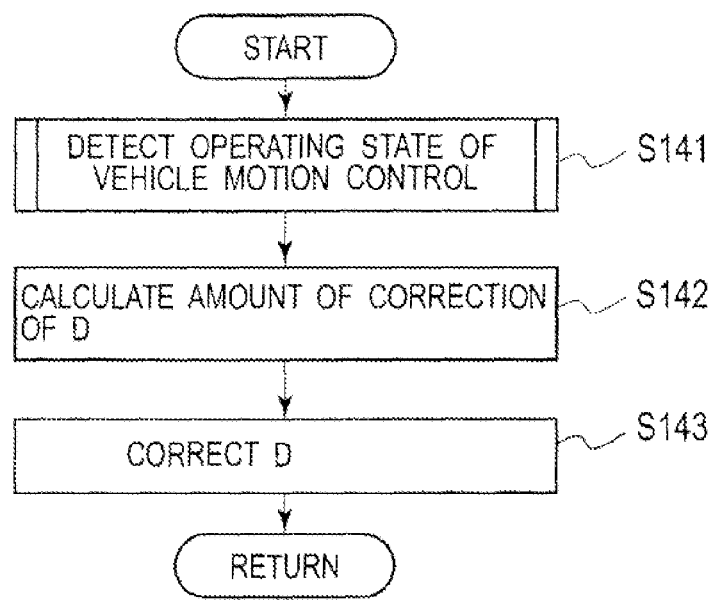
FIG. 56 is a flowchart showing processing for correcting the driver's contribution amount according to the fourteenth embodiment.

FIG. 56 is a flowchart showing a driver's contribution amount correction process according to the fourteenth embodiment.

At first, at step S141, the process detects the operating state of the driving assistance system.

Specifically, the process classifies the risk degree (which is observed when the control intervention is effected) into "low risk" and "high risk" per driving assistance system. For example, the distance control (MB) is classified as "low risk" and the anti-lock brake system (ABS) and stability control (VDC) are classified as "high risk." Then, the process counts the number of control interventions (operation frequency) of the low risk driving assistance system and the operation frequency of the high risk driving assistance system.

Figure 57:
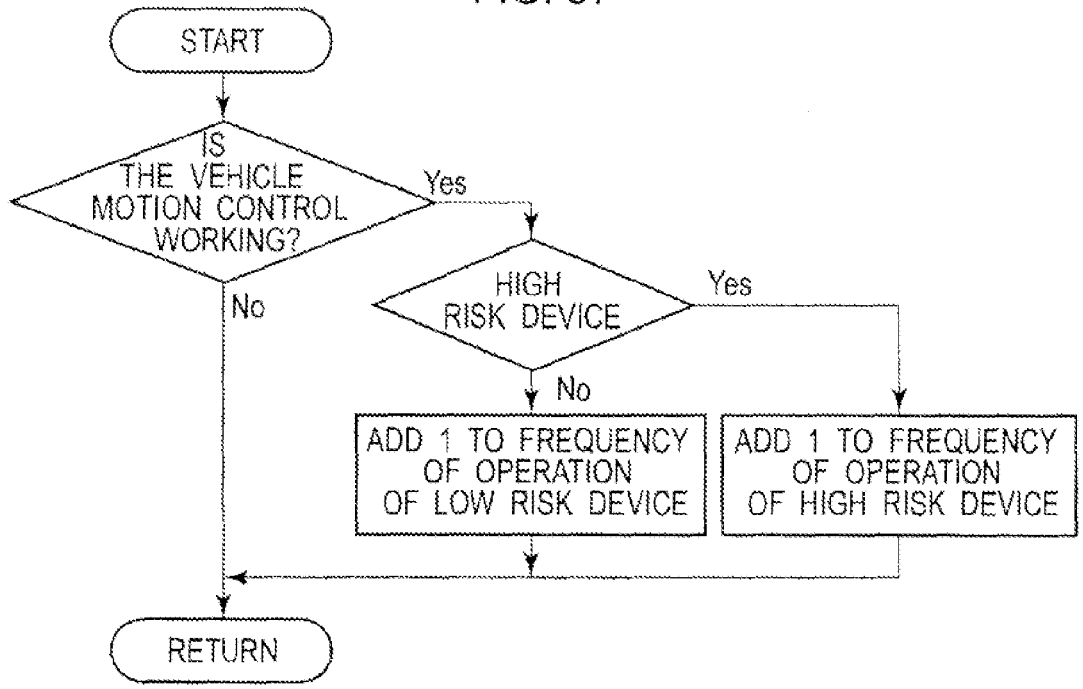
FIG. 57 illustrates an example of a flowchart showing processing for counting the number of outbreak of control intervention.

FIG. 57 is an example of a flowchart showing an operation frequency counting process.

As shown FIG. 57, when the driving assistance system works, the process determines whether the driving assistance system is of low risk or high risk (making a distinction), and then counts the operation frequency.

At the subsequent step S142, the process individually calculates the correction amount C according to the operation frequency of the low risk driving assistance system and the operation frequency of the high risk driving assistance system. Each correction amount C is set in a range of −50% to 50%.

Stated hereinafter is the case of the low risk driving assistance system. The process sets the correction amount C to 0 when the operation frequency is 0. When the operation frequency is increased to a proper standard frequency for low risk (for example, five), the process enlarges the correction amount C to the minus side for lowering the driver's contribution amount D. Then, when the operation frequency goes beyond the standard frequency, the higher the operation frequency is, the smaller the minus portion of the correction amount C is. Then, with 0 as a boundary, the process enlarges the correction amount C to the plus side for increasing the driver's contribution amount D.

Figure 58:
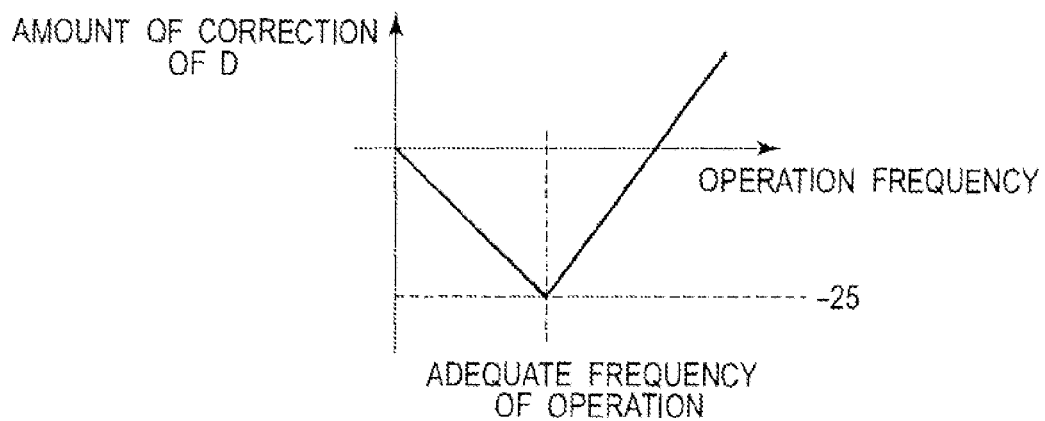
FIG. 58 is a graphical representation for the relationship between the number of outbreak of control intervention by a vehicle motion control that is considered to create low risk and the amount of correction.

FIG. 58 is a graph showing the relation between the operation frequency and the correction amount C in the case of the low risk driving assistance system.

As shown in FIG. 58, when the operation frequency is close to the standard frequency, the correction amount C is the largest to the minus side (for example, −25%), then the minus portion of the correction amount C is smaller as the operation frequency is away from the standard frequency.

Stated hereinafter is the case of the high risk driving assistance system. The process sets the correction amount C to 0 when the operation frequency is 0, and then as the operation frequency is increased, the process enlarges the correction amount C to the minus side. Herein, a slope is changed at a boundary between a first region to a proper standard frequency for high risk (for example, three) and a second region beyond the standard frequency for high risk, and −50% is set as a lower limit.

Figure 59:
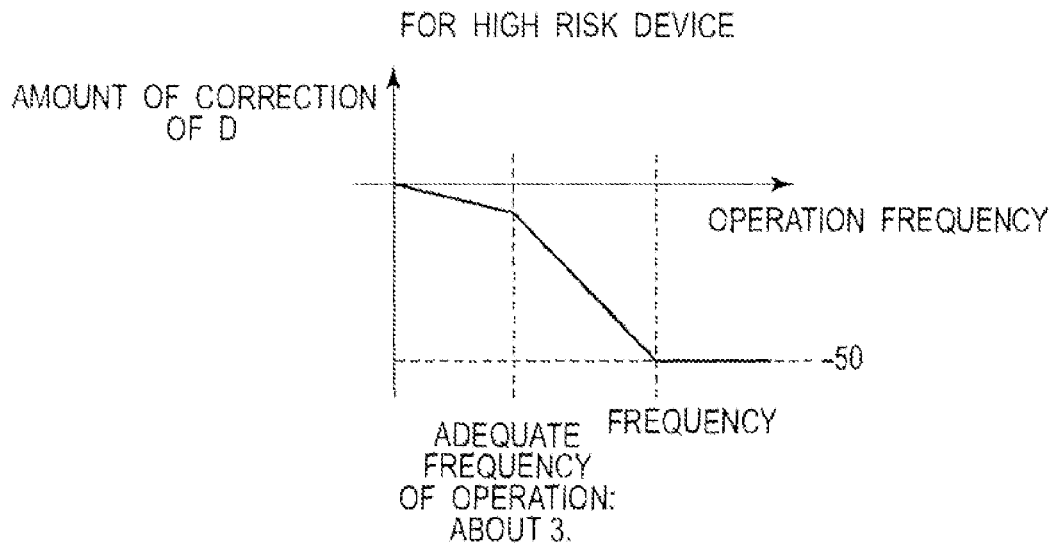
FIG. 59 is a graphical representation for the relationship between the number of outbreak of a control intervention by a vehicle motion control that is considered to create high risk and the amount of correction.

FIG. 59 is a graph showing the relation between the operation frequency and the correction amount C in the case of the high risk driving assistance system.

As shown in FIG. 59, the larger the operation frequency is, the smaller the correction amount C is in a range of 0% to −50%.

At the subsequent step S143, the process adds each correction amount C to the driver's contribution amount D (which is already calculated) to thereby correct the driver's contribution amount D and then returns to the predetermined main program.

In addition, when the corrected result is less than 0%, 0% is set as the lower limit, while when the corrected result is more than 100%, 100% is set as the upper limit, thus implementing the limiter process.

<<Operation>>

The operation frequency of the driving assistance system correlates with the driver's contribution amount D. Thus, the process individually calculates the operation frequency of the low risk driving assistance system and the operation frequency of the high risk driving assistance system (step S141), then calculates the correction amount C according to the respective operation frequencies (step S142), and then adds the thus calculated correction amount C to the driver's contribution amount D (which is already calculated), to thereby correct the driver's contribution amount D (step S143).

That is, in the case of the low risk driving assistance system, the process corrects the driver's contribution amount D lower until the standard frequency. Afterward, as the operation frequency is increased, the process regards that the driver is driving by positively intervening control, thereby correcting the driver's contribution amount D higher. Moreover, in the case of the high risk driving assistance system, the process corrects the driver's contribution amount D lower as the operation frequency is increased.

<<Effect>>

The process corrects the driver's contribution amount D according to the control operation frequency of the driving assistance system.

With this, the process can calculate the driver's contribution amount D more accurately and precisely.

Fifteenth Embodiment

Structure

In the fifteenth embodiment, the process corrects the driver's contribution amount D according to a driving period.

Figure 60:
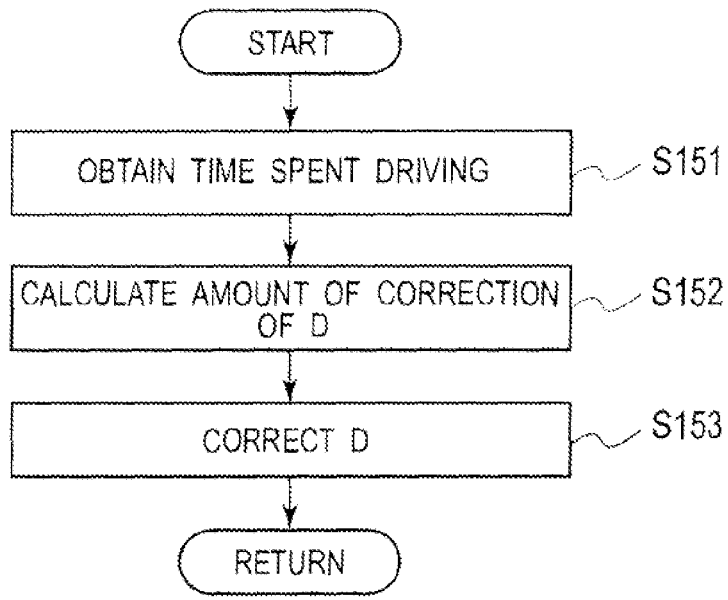
FIG. 60 is a flowchart showing processing for correcting the driver's contribution amount according to the fifteenth embodiment.

FIG. 60 is a flowchart showing a driver's contribution amount correction process according to the fifteenth embodiment.

At first, at step S151, the process detects a driving continuation time (driving elapsed time) T which is, for example, a time elapsed from when the engine is turned ON.

At the subsequent step S152, the process calculates the correction amount C according to the driving continuation time T.

The correction value is set in a range of −50% to 50%.

Herein, when the driving continuation time T [min] is smaller than a standard time T1 [min], the correction amount C is set to 0 as shown below.

$C=0$

Meanwhile, when the driving continuation time T [min] is larger than the standard time T1 [min], the correction amount C is calculated according to the expression below. Herein, "a" is a coefficient, for example, −0.1.

$C=a\cdot(T-T1)$

Figure 61:
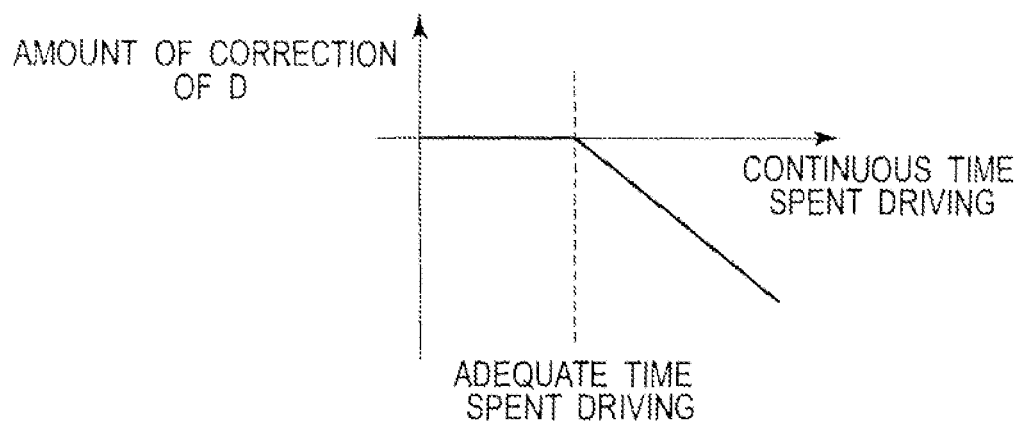
FIG. 61 is a graphical representation for the relationship between the time spent driving and the amount of correction.

FIG. 61 is a graph showing the relation between the driving continuation time T and the correction amount C.

As shown in FIG. 61, when the driving continuation time T is less than the standard time T1, the correction amount C is kept 0, and then as the driving continuation time T is increased over the standard time T1, the correction amount C is enlarged to the minus side.

At the subsequent step S153, the process adds the above correction amount C to the driver's contribution amount D (which is already calculated) to thereby correct the driver's contribution amount D and then returns to the predetermined main program.

In addition, when the corrected result is less than 0%, 0% is set as the lower limit, while when the corrected result is more than 100%, 100% is set as the upper limit, thus implementing the limiter process.

<<Operation>>

The driving continuation time T after driving start correlates with the driver's contribution amount D. Thus, the process measures the driving continuation time T (step S151), calculates the correction amount C according to the driving continuation time T (step S152), and adds the correction amount C to the driver's contribution amount D (which is already calculated), to thereby correct the driver's contribution amount D (step S153).

That is, when the driver continues driving for a long time, the driver's contribution amount D is supposed to be lowered, thus, the longer the driving continuation time T is, the lower the driver's contribution amount D is corrected.

<<Effect>>

The process corrects the driver's contribution amount D according to the driving continuation time T.

With this, the process can calculate the driver's contribution amount D more accurately and precisely.

Sixteenth Embodiment

Structure

In the sixteenth embodiment, the process corrects the driver's contribution amount D according to time zone.

Figure 62:
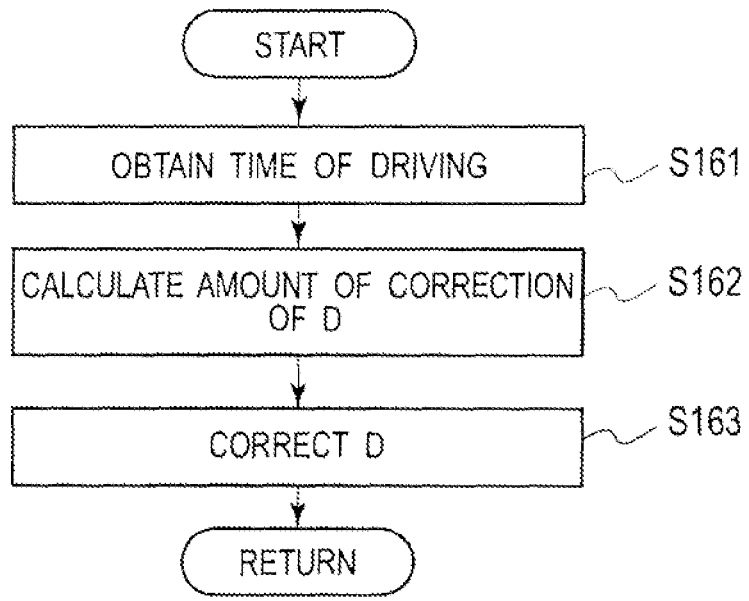
FIG. 62 is a flowchart showing processing for correcting the driver's contribution amount according to the sixteenth embodiment.

FIG. 62 is a flowchart showing a driver's contribution amount correction process according to the sixteenth embodiment.

At first, at step S161, the process detects the present time.

At the subsequent step S162, the process calculates the correction amount C according to whether or not the driving time is different from the time zone of ordinary driving.

The correction value is set in a range of 0 to 1.0.

Herein, for example, when the driver who ordinarily drives the vehicle in the "daytime" drives at "night," the process sets the correction amount C to the minus side.

Specifically, a total time Td for daytime driving and a total time Tn for night driving are each counted in advance, and then a correction item is to be calculated by the following expression.

When the driver who drives at night more often than in the daytime (Tn>Td) drives in the daytime, the correction amount C is calculated by the following expression.

$C=Td/(Td+Tn)$

Meanwhile, when the driver who drives in the daytime more often than at night (Tn<Td) drives at night, the correction amount C is calculated by the following expression.

$C=Tn/(Td+Tn)$

In cases other than the above, the correction amount C=1.

The above calculated correction value may be multiplied by a weighted coefficient a (for example, a=1.0).

In addition, the correction amount C may be calculated merely from the driving time.

Figure 63:
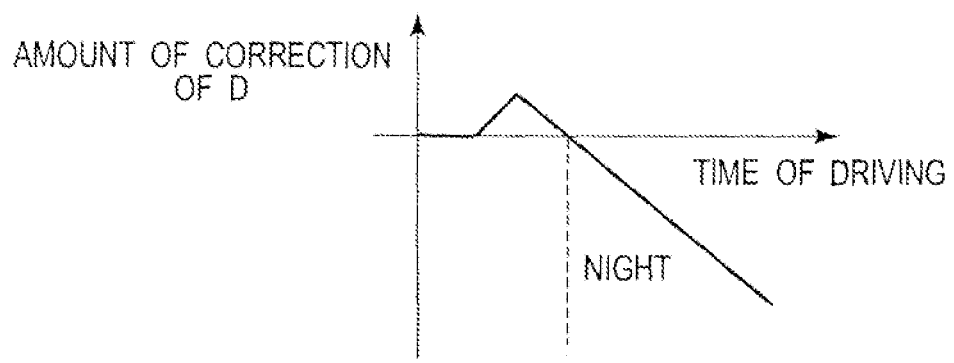
FIG. 63 illustrates an example of a graphical representation for the relationship between the time of driving and the amount of correction.

FIG. 63 is an example of a graph showing the relation between the driving time and the correction amount C.

As shown in FIG. 63, it is allowed that the correction amount C is enlarged to the minus side simply for the night driving to thereby lower the driver's contribution amount D.

At the subsequent step S163, the process adds the above correction amount C to the driver's contribution amount D (which is already calculated) to thereby correct the driver's contribution amount D and then returns to the predetermined main program.

In addition, when the corrected result is less than 0%, 0% is set as the lower limit, while when the corrected result is more than 100%, 100% is set as the upper limit, thus implementing the limiter process.

<<Operation>>

The time zone in which the driver is driving the vehicle correlates with the driver's contribution amount D. Thus, the process detects the driving time (step S161), calculates the correction amount C according to whether or not the present time is different from the ordinary driving time zone (step S162), and adds the correction amount C to the driver's contribution amount D (which is already calculated), to thereby correct the driver's contribution amount D (step S163).

That is, when the driver drives the vehicle in the time zone different from the ordinary time zone, the driver's contribution amount D is supposed to be lowered. In view of whether the driver ordinarily drives more often in the daytime or at night, the process corrects the driver's contribution amount D low when the driver drives the vehicle in the time zone different from the ordinary time zone.

In addition, the following operation is allowed: the process calculates the display content from the driver's contribution amount D and map, then, of the display contents weighted in advance, the process displays only the display content by select-high of the weights.

<<Effect>>

The process corrects the driver's contribution amount D according to the driving time zone.

With this, the driver's contribution amount D to the vehicle driving can be calculated in a wider scene and by simple calculations.

Seventeenth Embodiment

Structure

In the seventeenth embodiment, the process corrects the driver's contribution amount calculation per se.

Figure 64:
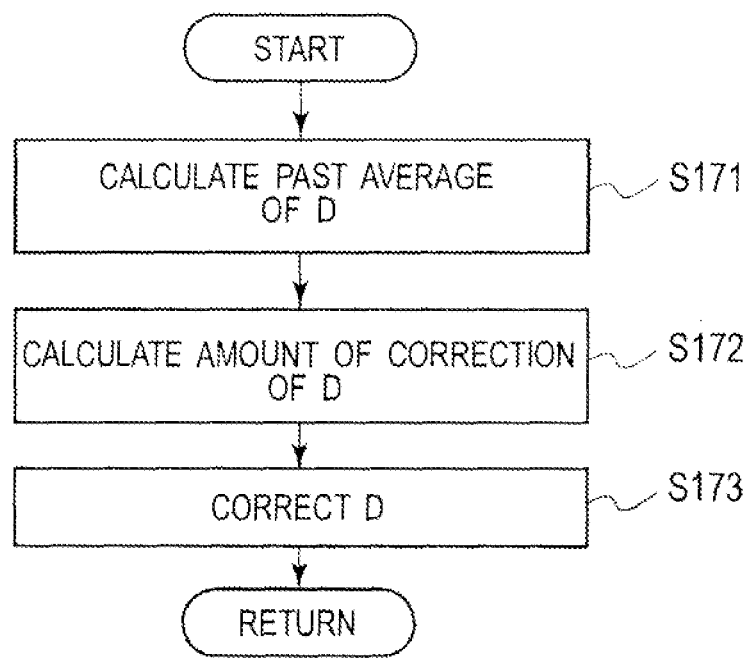
FIG. 64 is a flowchart showing processing for correcting the driver's contribution amount according to the seventeenth embodiment.

FIG. 64 is a flowchart showing a driver's contribution amount correction processing according to the seventeenth embodiment.

At first, at step S171, the process calculates the average of values of driver's contribution amount D during a predetermined duration of time in the past to give a past average of driver's contribution amount D before correction.

At the subsequent step S172, the process uses the above-mentioned past average and calculates the amount of correction C, which is expressed by the following formula.

[Formula 5]

$$C = \frac{\sum_{i=1}^{n}(D_i)}{n}$$

The amount of correction of the driver's contribution amount is set by a value falling in a range from −50% to 50%.

In addition, the calculated value of the amount of correction C may be multiplied by a weighted coefficient a (for example, a=1.0).

In addition, a limiter processing is carried out by setting 0% as the lower limit of the corrected driver's contribution amount when the value after correction is less than 0%, and by setting 100% as the upper limit of the corrected driver's contribution amount when the value after correction is more than 100%.

<<Operation>>

In the correction of the driver's contribution amount D, it is preferable to take into account the past average of the driver's contribution amount D before correction. Thus, the process calculates the correction amount C according to the past average before correction (step S172), and then adds the correction amount C to the driver's contribution amount D (which is already calculated) to thereby correct the driver's contribution amount D (step S173).

That is, the process suppresses a rapid change of the driver's contribution amount D by taking into account the past average.

In addition, the following operation is allowed: the process reads each display map from the method of calculating the driver's contribution amount D and then determines each display content from the calculated driver's contribution amount D and the map.

<<Effect>>

The process corrects the driver's contribution amount D according to the past average of the driver's contribution amount D.

With this, the process can calculate the driver's contribution amount D with errors reduced.

The entire contents of the Japanese Patent Application No. 2009-122846 (filed on May 21, 2009) and Japanese Patent Application No. 2010-107992 (tiled on Jan. 29, 2010) are herein incorporated by reference, in order to protect the applications from erroneous translations or omissions.

Although the present invention has been described above by reference to the first to seventeenth embodiments, the present invention is not limited to those embodiments, and it will be apparent to those skilled in the art that various modifications and improvements can be made.

INDUSTRIAL APPLICABILITY

With the driving assistance system according to the present invention, altering the visual form in which the information is presented in accordance with the driver's contribution amount can display the risk and control state more effectively than when uniformly displaying the visual information. Thus, the driver can easily understand the situation.

The invention claimed is:

1. A driver assistance system comprising:
at least one controller configured to provide a plurality of vehicle motion controls for controlling a vehicle based on a detected risk during driving the vehicle;
a display device configured to present information, in visual form, regarding at least one of (i) the detected risk, and (ii) an operating state of at least one of the vehicle motion controls;
a calculating unit configured to calculate a driver's contribution amount based at least on a first ratio of (i) motion of the vehicle depending on the driver's operation, to (ii) total motion of the vehicle; and
an altering unit configured to alter the visual form in which the information is presented based at least on the driver's contribution amount calculated by the calculating unit.

2. The driver assistance system according to claim 1, wherein the calculating unit is configured to calculate the driver's contribution amount based further on a second ratio of (i) predicted motion of the vehicle based on the driver's operation after a predetermined time passes, to (ii) predicted total motion of the vehicle after the predetermined time passes.

3. The driver assistance system according to claim 1, wherein the calculating unit is configured to calculate the driver's contribution amount based further on a predetermined relationship between the driver's contribution amount and the operating state of the at least one of the vehicle motion controls.

4. The driver assistance system according to claim 3, wherein the calculating unit is configured to calculate the driver's contribution amount based further on a quantity of active vehicle motion controls.

5. The driver assistance system according to claim 1, wherein the display device is configured to present, in visual form of an operating state indicator, a force acting on the vehicle when the at least one of the vehicle motion controls is active, and
wherein the altering unit is configured to alter the operating state indicator in such a way that, as the driver's contribution amount becomes lower, a size of the operating state indicator becomes larger.

6. The driver assistance system according to claim 1, wherein the display device is configured to present, in visual form of an operating state indicator, a force acting on the vehicle when the at least one of the vehicle motion controls is active, and
wherein the altering unit is configured to alter the operating state indicator in such a way that, as the driver's contribution amount becomes lower, a color of the operating state indicator changes to red from a color other than red.

7. The driver assistance system according to claim 1, wherein the display device is configured to present, in visual form of an operating state indicator, a force acting on the vehicle when the at least one of the vehicle motion controls is active, and
wherein the altering unit is configured to alter the operating state indicator in such a way that, as the driver's contribution amount becomes lower, a luminance of the operating state indicator becomes higher.

8. The driver assistance system according to claim 1, wherein the display device is configured to present, in visual form of an operating state indicator, the force acting on the vehicle when the at least one of the vehicle motion controls is active, and
wherein the altering unit is configured to alter the operating state indicator in such a way that, as the driver's contribution amount becomes lower, a blink speed of the operating state indicator becomes higher.

9. The driver assistance system according to claim 1, wherein the display device is configured to present, in visual form of a risk indicator, the detected risk during driving the vehicle, and
wherein the altering unit is configured to alter the risk indicator in such a way that, as the driver's contribution amount becomes higher, a color of the risk indicator changes to blue from a color other than blue.

10. The driver assistance system according to claim 1, wherein the display device is configured to present, in visual form of a risk indicator, the detected risk during driving the vehicle, and
wherein the altering unit is configured to alter the risk indicator in such a way that, as the driver's contribution amount becomes higher, a luminance of the risk indicator becomes higher.

11. The driver assistance system according to claim 1, wherein the display device is configured to present, in visual form of a risk indicator, the detected risk during driving the vehicle, and
wherein the altering unit is configured to alter the risk indicator in such a way that, as the driver's contribution amount becomes lower, a blink speed of the risk indicator becomes higher.

12. The driver assistance system according to claim 1, wherein the altering unit is configured to alter a display image of the vehicle on the display device in such a way that, as the driver's contribution amount becomes lower, a magnification of the display image of the vehicle becomes larger.

13. The driver assistance system according to claim 1, wherein the display device is configured to present at least one of (i) a future state of a risk during driving the vehicle, (ii) a present state of motion of the vehicle depending on the operating state of the at least one of the vehicle motion controls, and (iii) a past state of the motion of the vehicle depending on the operating state of the at least one of the vehicle motion controls.

14. The driver assistance system according to claim 1, wherein the calculating unit is configured to calculate a frequency of driver's operation, and the calculating unit is configured to calculate the driver's contribution amount based further on the calculated frequency.

15. The driver assistance system according to claim 1, wherein the calculating unit is configured to calculate a waking state of the driver, and the calculating unit is configured to calculate the driver's contribution amount based further on the calculated waking state.

16. The driver assistance system according to claim 1, wherein the calculating unit is configured to calculate how many times in the past the vehicle driver drove on a present route, and the calculating unit is configured to calculate the driver's contribution amount based further on the calculated number of times.

17. The driver assistance system according to claim 1, wherein the calculating unit is configured to detect traffic congestion, and the calculating unit is configured to calculate the driver's contribution amount based further on the detected traffic congestion.

18. The driver assistance system according to claim 1, wherein the calculating unit is configured to calculate the driver's contribution amount based further on a speed limit for a road on which the driver is driving.

19. The driver assistance system according to claim 1, wherein the calculating unit is configured to detect a quantity of other vehicles in the surroundings of the vehicle, and the calculating unit is configured to calculate the driver's contribution amount based further on the detected number of other vehicles.

20. A driver assistance method comprising:
controlling a vehicle using at least one of a plurality of vehicle motion controls based on a detected risk during driving the vehicle;
presenting information, in visual form, regarding at least one of (i) the detected risk, and (ii) an operating state of the at least one of the vehicle motion controls;

calculating a driver's contribution amount in driving the vehicle based at least on a first ratio of (i) motion of the vehicle depending on the driver's operation, to (ii) total motion of the vehicle; and altering the visual form in which the information is presented based at least on the calculated driver's contribution amount.

* * * * *